(12) United States Patent
Machida et al.

(10) Patent No.: US 8,138,279 B2
(45) Date of Patent: Mar. 20, 2012

(54) BIAXIALLY ORIENTED POLYARYLENE SULFIDE FILM

(75) Inventors: Tetsuya Machida, Otsu (JP); Masatoshi Ohkura, Otsu (JP); Yasuyuki Imanishi, Otsu (JP); Takuji Higashioji, Otsu (JP)

(73) Assignee: Toray Industries, Inc., Tokyo (JP)

( * ) Notice: Subject to any disclaimer, the term of this patent is extended or adjusted under 35 U.S.C. 154(b) by 454 days.

(21) Appl. No.: 12/300,094

(22) PCT Filed: May 9, 2007

(86) PCT No.: PCT/JP2007/059566
§ 371 (c)(1),
(2), (4) Date: Apr. 16, 2009

(87) PCT Pub. No.: WO2007/129721
PCT Pub. Date: Nov. 15, 2007

(65) Prior Publication Data
US 2009/0311501 A1    Dec. 17, 2009

(30) Foreign Application Priority Data

May 10, 2006  (JP) ................................. 2006-131102

(51) Int. Cl.
*C08F 283/00* (2006.01)

(52) U.S. Cl. ........ 525/537; 525/535; 525/474; 525/417; 525/403; 528/389; 528/388; 528/373; 524/114; 524/186; 524/196; 524/500; 428/220

(58) Field of Classification Search .................. 525/537, 525/535, 474, 417, 403; 528/389, 388, 373; 524/114, 186, 196, 500; 428/220
See application file for complete search history.

(56) References Cited

U.S. PATENT DOCUMENTS

| | | | | |
|---|---|---|---|---|
| 4,894,419 A | * | 1/1990 | Mizuno et al. | 525/189 |
| 5,350,806 A | * | 9/1994 | Yu et al. | 525/189 |
| 2002/0167111 A1 | * | 11/2002 | Tsunekawa et al. | 264/210.7 |
| 2007/0265375 A1 | * | 11/2007 | Ishio et al. | 524/114 |

FOREIGN PATENT DOCUMENTS

| | | |
|---|---|---|
| JP | 8-59993 A | 3/1996 |
| JP | 2001-261959 A | 9/2001 |
| JP | 2003-113307 A | 4/2003 |
| WO | WO-2006/051658 A1 | 5/2006 |
| WO | WO-2007/049571 A1 | 5/2007 |

OTHER PUBLICATIONS

Chem YQ (Online Dictionary, 2005).*

* cited by examiner

*Primary Examiner* — Randy Gulakowski
*Assistant Examiner* — Shane Fang
(74) *Attorney, Agent, or Firm* — Birch, Stewart, Kolasch & Birch, LLP

(57) ABSTRACT

A biaxially oriented polyarylene sulfide film made of a polyarylene sulfide resin composition has a melt crystallization temperature of not lower than 160° C. and not higher than 220° C. The biaxially oriented polyarylene sulfide film contains 70 to 99 parts by weight of the polyarylene sulfide and 1 to 30 parts by weight of thermoplastic resin A; the thermoplastic resin A constitutes a dispersed phase having an average dispersion diameter of 50 nm to 500 nm. The biaxially oriented polyarylene sulfide film has a breaking stress at 200° C. in the machine direction and/or transverse direction of not less than 30 MPa and not more than 90 MPa and has an elongation at break at 200° C. in the machine direction and/or transverse direction of not less than 100% and not more than 250%.

13 Claims, No Drawings

BIAXIALLY ORIENTED POLYARYLENE SULFIDE FILM

TECHNICAL FIELD

The present invention relates to a biaxially oriented polyarylene sulfide film having an excellent heat resistance, dimensional stability, electrical properties and chemical resistance, as well as an excellent moldability and film-forming stability. The biaxially oriented polyarylene sulfide film of the present invention may be used as an electrical insulating material or molding material in motors, transformers, insulative cables and the like; circuit board material; step or mold releasing film or protective film in circuit or optical parts; a material in lithium ion batteries; a material in fuel cells; speaker diaphragm; or the like. More particularly, the present invention relates to a biaxially oriented polyarylene sulfide film having an excellent heat moldability, which may be suitably used as an electrical insulative material in motors of hot water supply equipment; electrical insulative material in motors of car air conditioner and driving motors used in hybrid cars and the like; as a speaker diaphragm for mobile phones; and so on.

For electrical insulating materials for motors, it is recently demanded to have heat resistance at high temperatures and hydrolysis resistance. For example, new alternatives for cooling medium have been proposed as electrical insulating materials for motors used in refrigerators and air conditioners, in connection with abolition of specific chlorofluorocarbons in view of an environmental problem. Since such cooling media and their compatible lubricants easily absorb water, above-mentioned insulating materials, are demanded to have hydrolysis resistance in addition to heat resistance. In electrical insulating materials for motors used in hybrid ears, since water is infiltrated into the materials under use environment, they are demanded to have hydrolysis resistance in addition to heat resistance.

As diaphragms of audio equipments made of a plastic, those using polyethylene terephthalate (PET) film, and those using polyethylene naphthalate (PEN) or polyetherimide (PEI) having better heat resistance and rigidity than PET are used.

The diaphragms of audio equipments using PET are likely to thermally deform at temperatures not lower than 65° C. when they are used for speakers having a small diameter, for example, for mobile phones and the like, so that their heat resistance is not sufficient. On the other hand, although the diaphragms of audio equipments using PEN have a better heat resistance than those using PET, their heat resistance is not still sufficient. The diaphragms of audio equipments using PEI have problems in that rolling or sound distortion is likely to occur depending on the shape of the speaker diaphragm so that the audio characteristics are bad, and when the external output is large, the film may not withstand and may break.

Since polyarylene sulfide films have characteristics such as excellent heat resistance, inflammability, rigidity, chemical resistance, electrical insulation and low moisture absorption, application of polyphenylene sulfide (hereinafter also referred to as "PPS") films to electrical insulative materials and to speaker diaphragms is now being developed. For example, (1) it is known to use biaxially oriented films as electrical insulative materials (see Patent Literature 1). Further, (2) a film for audio diaphragms made of polyphenylene sulfide (PPS) has been proposed (Patent Literature 2).

However, the above-described conventional films and sheets have the following problems: That is, the films described in (1) above may have an insufficient tensile elongation at break and toughness, so that the film may break when used as a slot liner or wedge of a motor. To improve the moldability, it has been proposed to mold the film under heat (see Patent Literature 3). However, since the decrease in the breaking stress or the increase in the elongation at break of PPS films by heating is small, improvement in heat moldability is difficult. With the films of the above-described (2), since the elongation at break is small and the increase in the elongation at break by heating is small, there is a problem in that film breakage occurs in the heat molding process.

As described above, since the polyphenylene sulfide films have a low tensile elongation at break and toughness, their applications are limited now, and improvement thereof is strongly demanded. To improve the toughness thereof, resin compositions and films containing a thermoplastic resin other than polyphenylene sulfide, which thermoplastic resin is mixed in the polyphenylene sulfide have been proposed. For example, a composition containing nylon 11 and nylon 12 dispersed in PPS with an average dispersion diameter of not more than 1 μm (see Patent Literature 4); a composition made of PPS, polyamide and epoxy resin (see Patent Literature 5); a composition made of PPS and a polyamide (see Patent Literatures 6 and 7); a film made of PPS and a polyetherimide (see Patent Literature 8); a film made of PPS and polysulfone (see Patent Literature 9); and the like have been disclosed. However, a resin composition or film in which a thermoplastic resin is finely dispersed in PPS at a dispersion diameter of 50 nm to 500 nm is not described; none of them has a sufficient decrease in breaking stress and increase in elongation at break by heating the polyphenylene sulfide film; and their film-forming stability is not sufficient. On the other hand, a resin composition in which a polyamide is ultrafinely dispersed has been proposed (see Patent Literature 10). However, when molding a sheet or film, the structural stability may not be sufficient, and a best method for molding a biaxially oriented film is not described. Further, a resin composition in which a polyetherimide is ultrafinely dispersed has been proposed (see Patent Literature 11). With this resin composition, the increase in the elongation at break by heating is not sufficient, so that the improvement in heat moldability is not sufficient.

Patent Literature 1: JP 55-35456 A
Patent Literature 2: JP 6-305019 A
Patent Literature 3: JP 6-335960 A
Patent Literature 4: JP 3-81367 A
Patent Literature 5: JP59-155462A
Patent Literature 6: JP 63-189458 A
Patent Literature 7: JP 2001-302918 A
Patent Literature 8: JP 4-146935 A
Patent Literature 9: JP 62-121761 A
Patent Literature 10: 3P2003-113307A
Patent Literature 11: JP2001-261959A

DISCLOSURE OF THE INVENTION

Problems to be Solved by the Invention

Accordingly, an object of the present invention is to provide a biaxially oriented polyarylene sulfide film having an excellent heat resistance, dimensional stability, electrical properties and chemical resistance, which further has an excellent heat moldability brought about by the decrease in breaking stress and increase in the elongation at break at 200° C., and to provide a biaxially oriented polyarylene sulfide film having an excellent film-forming stability. It is an object of the present invention to provide a film which may be used as an electrical insulating material or molding material in motors, transformers, insulative cables and the like; circuit board material; step or mold releasing film or protective film in circuit or optical parts; a material in lithium ion batteries; a material in fuel cells; speaker diaphragm; or the like; more particularly, which may be suitably used as an electrical insulative material in motors of hot water supply equipment; electrical insulative material in motors of car air conditioner and driving motors used in hybrid cars and the like; as a speaker diaphragm for mobile phones; and so on.

Means for Solving the Problems

To attain the above-described objects, the present invention has the following constitutions:

(1) A biaxially oriented polyarylene sulfide film made of a polyarylene sulfide resin composition having a melt crystallization temperature of not lower than 160° C. and not higher than 220° C., the biaxially oriented polyarylene sulfide film comprising a thermoplastic resin A different from the polyarylene sulfide; the thermoplastic resin A constituting a dispersed phase having an average dispersion diameter of 50 nm to 500 nm; the polyarylene sulfide having a content of 70 to 99 parts by weight and the thermoplastic resin A having a content of 1 to 30 parts by weight taking the total content of the polyarylene sulfide and the thermoplastic resin A as 100 parts by weight; the biaxially oriented polyarylene sulfide film having a breaking stress at 200° C. in the machine direction and/or transverse direction of not less than 30 MPa and not more than 90 MPa and having an elongation at break at 200° C. in the machine direction and/or transverse direction of not less than 100% and not more than 250%.

(2) The biaxially oriented polyarylene sulfide film according to (1), having breaking stresses at 200° C. in the machine and transverse directions of not less than 30 MPa and not more than 90 MPa and having elongations at break at 200° C. in the machine and transverse directions of not less than 120% and not more than 250%.

(3) The biaxially oriented polyarylene sulfide film according to (1), having a melt crystallization temperature of not lower than 170° C. and not higher than 220° C.

(4) The biaxially oriented polyarylene sulfide film according to (1), having breaking stresses at 200° C. in the machine and transverse directions of not less than 30 MPa and not more than 70 MPa and having elongations at break at 200° C. in the machine and transverse directions of not less than 130% and not more than 230%.

(5) The biaxially oriented polyarylene sulfide film according to (1), wherein the dispersed phase made of the thermoplastic resin A comprises at its interface silicon atoms constituting siloxane bonds.

(6) The biaxially oriented polyarylene sulfide film according to any one of (1), to (5) wherein the polyarylene sulfide is polyphenylene sulfide.

(7) The biaxially oriented polyarylene sulfide film according to (1), wherein the thermoplastic resin A has a glass transition temperature of not lower than 150° C. and not higher than the melting point of the polyarylene sulfide.

(8) The biaxially oriented polyarylene sulfide film according to (1), produced by melt film-forming a resin composition prepared by kneading raw materials including the polyarylene sulfide, the thermoplastic resin A and a compatible plasticizer in an amount of 0.05 to 3 parts by weight containing at least one group selected from the group consisting of epoxy group, amino group and isocyanate group.

(9) The biaxially oriented polyarylene sulfide film according to (1), wherein the thermoplastic resin A is at least one polymer selected from the group consisting of polyarylates, polyphenylene ethers, polyetherimides, polyethersulfones and polysulfones.

(10) The biaxially oriented polyarylene sulfide film according to (1), having a film thickness of not less than 6 μm and not more than 500 μm.

(11) The biaxially oriented polyarylene sulfide film according to (1), having a film thickness of not less than 20 μm and not more than 500 μm.

(12) The biaxially oriented polyarylene sulfide film according to (1), having a small endothermic peak immediately below the melting point, the endothermic peak being at a temperature not lower than 220° C. and not higher than 280° C.

(13) A process for producing the biaxially oriented polyarylene sulfide film according to (1), the process comprising melt-kneading an acid-terminated polyarylene sulfide(s), thermoplastic resin A and a compatible plasticizer(s) to prepare master chips; melt-kneading the obtained master chips with Na-terminated and/or Ca-terminated polyarylene sulfide(s) to obtain a composition; and biaxially stretching the composition.

(14) A process for producing the biaxially oriented polyarylene sulfide film according to (1), the process comprising heat-setting carried out in not less than two steps at different temperatures, wherein the first step thereof is carried out at a temperature of 160° C. to 240° C., and wherein the maximum temperature in the second and later heat-setting steps is not lower than the heat-setting temperature in the first step and at a temperature of 220° C. to 280° C.

Effects of the Invention

By the present invention, as described below, a biaxially oriented polyarylene sulfide film having an excellent heat resistance, dimensional stability, electrical properties and chemical resistance, which has an excellent heat moldability brought about by the decrease in breaking stress and increase in the elongation at break at 200° C. can be obtained, and a biaxially oriented polyarylene sulfide film having an excellent film-forming stability can be obtained. Especially, a biaxially oriented polyarylene sulfide film having an excellent heat moldability, which may be suitably used as an electrical insulative material in motors of hot water supply equipment; electrical insulative material in motors of car air conditioner and driving motors used in hybrid cars and the like; as a speaker diaphragm for mobile phones; and so on, can be obtained.

BEST MODE FOR CARRYING OUT THE INVENTION

The biaxially oriented polyarylene sulfide film of the present invention will now be described. The biaxially oriented polyarylene sulfide film of the present invention comprises a polyarylene sulfide and a thermoplastic resin A which is different from the polyarylene sulfide. In the biaxially oriented polyarylene sulfide film, the content of the polyarylene sulfide is 70 to 99 parts by weight and the content of the thermoplastic resin A is 1 to 30 parts by weight taking the total content of the polyarylene sulfide and the thermoplastic resin A as 100 parts by weight. The thermoplastic resin A constitutes a dispersed phase, and the average dispersion diameter is 50 nm to 500 nm. By this, decrease in the breaking stress and increase in the elongation at break by heating can be given to the film to be obtained.

In the biaxially oriented polyarylene sulfide film, taking the total content of the polyarylene sulfide and the thermoplastic resin A as 100 parts by weight, the content of the polyarylene sulfide is preferably 70 to 97 parts by weight and the content of the thermoplastic resin A is preferably 3 to 30 parts by weight; and the content of the polyarylene sulfide is more preferably 90 to 95 parts by weight and the content of the thermoplastic resin A is more preferably 5 to 10 parts by weight. If the content of the thermoplastic resin A is more than 30 parts by weight, the heat resistance or chemical resistance of the biaxially oriented polyarylene sulfide film may be decreased, and the increase in the elongation at break by heating which is an advantageous effect of the present invention may not be attained in some cases. On the other hand, if the content of the thermoplastic resin A is less than 1 part by weight, it may be difficult to attain the decrease in the breaking stress and increase in the elongation at break by heating in some cases.

The biaxially oriented polyarylene sulfide film of the present invention has an excellent heat resistance, chemical resistance and electrical properties which the polyarylene sulfide films intrinsically have, as well as excellent heat moldability.

To attain these characteristics, it is important that the polyarylene sulfide form a sea phase (continuous phase or matrix), and the thermoplastic resin A other than the polyarylene sulfide form an island phase (dispersed phase). The term "dispersed phase" herein means the phase dispersed in the form of islands in the sea phase which is a continuous phase, wherein the film is composed of two or more phases which can be observed with a light microscope or electron microscope, the dispersed phase having an interface through which the sea phase and the island phase contact. The shape of the each region of the dispersed phase is, for example, substantially spherical, in the shape of elongated island, substantially oval or fibrous. As for the shape, as long as the dispersed phase regions almost have the above-mentioned shape, it is acceptable and the interface between the sea phase and the island phase may be irregular or may be in the form of a multifoil. Those wherein the adjacent regions of the dispersed phase are bound are also included. In the biaxially oriented polyarylene sulfide film of the present invention, each dispersed phase region is preferably spherical from the viewpoint of attaining the improvement in the heat moldability which is an effect of the present invention. The dispersed phase in the present invention can be observed with a transmission electron microscope. Further, it is important that the average dispersion diameter of the thermoplastic resin A be 50 nm to 500 nm, preferably 70 nm to 300 nm, more preferably 100 nm to 200 nm. By the fact that the polyarylene sulfide forms a continuous phase, the excellent heat resistance, chemical resistance and electrical properties of the polyarylene sulfide can be reflected in the film to a high degree. Further, by making the average dispersion diameter be in the range described above, a biaxially oriented polyarylene sulfide film having an excellent balance of the heat resistance and the improved moldability can be obtained. If the average dispersion diameter is less than 50 nm, the effects of the present invention to decrease the breaking stress and increase the elongation at break by heating may not be given sufficiently. On the other hand, if the average dispersion diameter is larger than 500 nm, the heat resistance may be deteriorated or breakage of the film may occur during the stretching in the film-formation. In cases where the adjacent dispersed phase regions are bound, the dispersed phase region in the form of sphere, elongated island, oval or fiber is counted as one dispersed phase region when calculating the average dispersion diameter.

The term "average dispersion diameter" herein means the average value of the diameters in the machine direction of the film and the diameters of the transverse direction of the film. The average dispersion diameter can be measured using a transmission electron microscope. For example, the average dispersion diameter can be calculated by preparing a sample by the ultrathin cutting method; observing the sample with a transmission electron microscope at an acceleration voltage of 100 kV; taking photographs at a magnification of ×20,000; capturing the obtained photographs in an image analyzer as an image; selecting arbitrary 100 dispersed phase regions; and performing image processing (the measurement method will be described later in detail).

The aspect ratio of the dispersed phase regions is not restricted and is preferably in the range between 1 and 20, more preferably in the range between 1 and 10, still more preferably in the range between 1 and 5. By making the aspect ratio of the island components be within the range described above, the biaxially oriented film of the present invention can be produced stably, and a biaxially oriented polyarylene sulfide film wherein the increase in the elongation at break by heating is promoted is likely to be obtained, which is preferred. The term "aspect ratio" herein means the ratio of average longer diameter/average shorter diameter, of the dispersed phase regions. The aspect ratio can be measured using a transmission electron microscope. For example, the aspect ratio can be calculated by preparing a sample by the ultrathin cutting method; observing the sample with a transmission electron microscope at an acceleration voltage of 100 kV; taking photographs at a magnification of ×20,000; capturing the obtained photographs in an image analyzer as an image; selecting arbitrary 100 dispersed phase regions; and performing image processing (the measurement method will be described later in detail).

As used herein, the polyarylene sulfide is a homopolymer or copolymer having a repeating unit —(Ar—S)—. Ar includes structural units represented by the following formula (A) to (K).

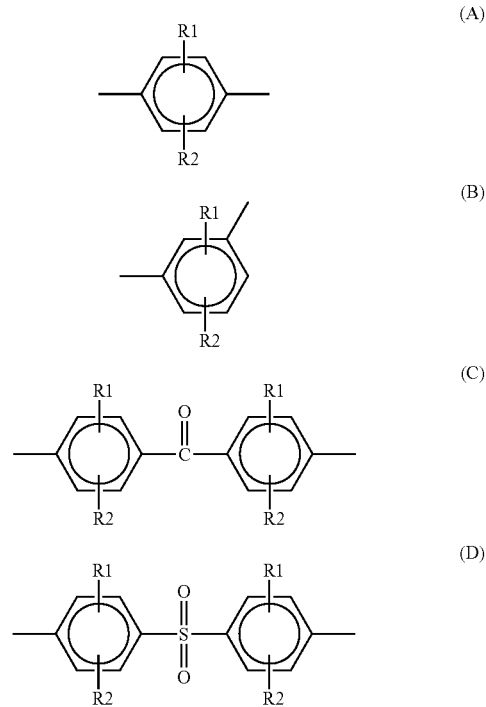

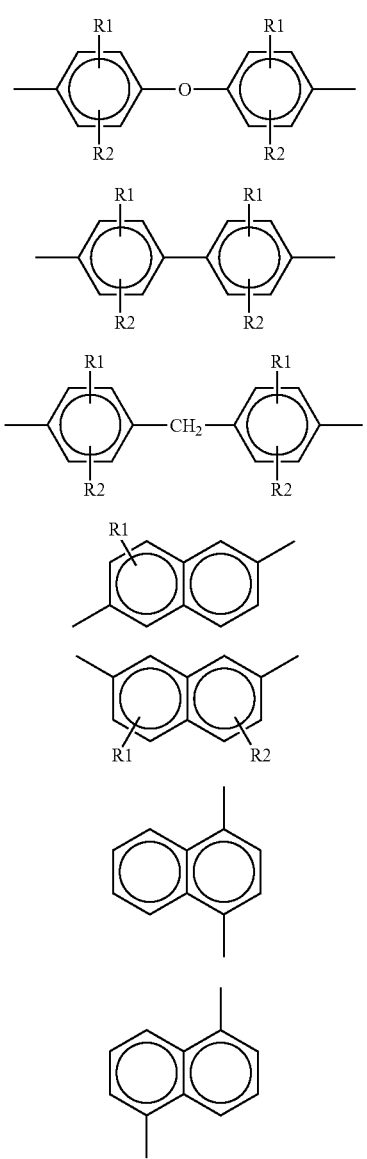

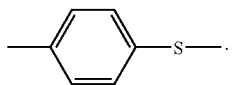

(wherein R1 and R2 each represent a substituent group selected from hydrogen, alkyl groups, alkoxy groups and halogens; and R1 and R2 may be the same or different.)

The repeating units in the polyarylene sulfide used in the present invention preferably have a structure represented by the above formula (A). Representative examples thereof include polyphenylene sulfide, polyphenylene sulfide sulfone, polyphenylene sulfide ketone, random copolymers and block copolymers thereof and mixtures thereof. From the viewpoint of physical properties of the film and economy, the polyarylene sulfide is particularly preferably polyphenylene sulfide (PPS) that is a resin containing, as the major constituent units of the polymer, preferably at least 80 mol %, more preferably at least 90 mol %, p-phenylene sulfide units represented by the structural formula below. When such a p-phenylene sulfide component is less than 80 mol %, the crystallinity and heat transfer temperature of the polymer are low, and the properties of PPS, that is, heat resistance, dimensional stability, mechanical properties and dielectric characteristics may be deteriorated.

In the above-mentioned PPS resin, other copolymerizable sulfide linkage-containing units may be contained in an amount of less than 20 mol %, preferably less than 10 mol %, based on the total repeating units. Examples of the repeating units contained in an amount of less than 20 mol %, preferably less than 10 mol %, based on the total repeating units include, for example, trifunctional units, ether units, sulfone units, ketone units, meta-linkage units, aryl units having a substituent group(s) such as an alkyl group(s), biphenyl unit, terphenylene unit, vinylene unit and carbonate unit, and specific examples include the following structural units. Among these units, one or more units can be coexistent to constitute the resin. In this case, the structural units may be copolymerized to form a random or block copolymer.

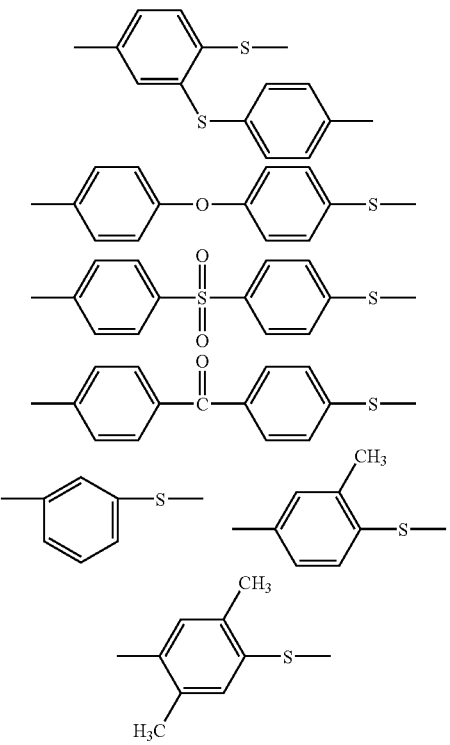

The melt viscosity of the PPS resin and the PPS resin composition is not restricted as long as melt kneading can be carried out, and preferably in the range between 100 Pa·s and 2000 Pa·s, more preferably in the range between 200 Pa·s and 1000 Pa·s at 315° C. at a shear rate of 1000 (1/sec).

The PPS in the present invention can be produced by various methods, for example, the method described in JP 45-3368 B by which a polymer having a relatively small molecular weight is obtained; or by the method described in JP 52-12240 B or JP 61-7332 A by which a polymer having a relatively large molecular weight is obtained.

In the present invention, the obtained PPS resin may be used after various treatments such as crosslinking/increasing molecular weight by heating in the air; heat treatment in an inert gas atmosphere such as nitrogen or under reduced pressure; washing with an organic solvent, hot water or an aqueous acid solution; activation by a functional group-containing compound such as an acid anhydride, amine, isocyanate or functional disulfide compound; and the like.

A production process of the PPS resin will now be exemplified, but the production process is not restricted thereto. For example, sodium sulfide and p-dichlorobenzene are reacted in an amide polar solvent such as N-methyl-2-pyrrolidone (NMP) at a high temperature and high pressure. A copolymerization component(s) such as a trihalobenzene may be incorporated as required. Caustic potassium, alkaline metal carboxylate or the like as a polymerization degree adjusting agent is added and polymerization reaction is allowed to occur at 230° C. to 280° C. After the polymerization, the polymer is cooled and the polymer in the form of an aqueous slurry is filtered to obtain the polymer in the form of granules. The resulting polymer is stirred in an aqueous solution of an acetic acid salt or the like at 30° C. to 100° C. for 10 to 60 minutes, and washed with ion-exchanged water several times at 30° C. to 80° C., followed by drying to obtain PPS powder. After washing the obtained powdery polymer with NMP under an oxygen partial pressure of not higher than 10 Torr, preferably not higher than 5 Torr, the polymer is washed several times with ion-exchanged water at 30° C. to 80° C., and dried under reduced pressure of not higher than 5 Torr. Since the thus obtained polymer is substantially linear PPS polymer, stable film-formation by stretching can be attained. Needless to say, as required, other macromolecular compound(s); inorganic and organic compound(s) such as silicon oxide, magnesium oxide, calcium carbonate, titanium oxide, aluminum oxide, crosslinked polyester(s), crosslinked polystyrene, mica, talc and kaolin; a thermal decomposition inhibitor(s); thermal stabilizer(s); and antioxidant(s) may be added.

An example of the method for crosslinking/increasing molecular weight of the PPS resin by heating is a method wherein the resin is heated until a desired melt viscosity is attained at a prescribed temperature in a heating vessel under an oxidative gas atmosphere such as air or oxygen, or under a mixed gas atmosphere of the above-mentioned oxidative gas and an inert gas such as nitrogen or argon. The heat treatment temperature is usually selected from the range between 170° C. and 280° C., preferably between 200° C. and 270° C., and the heat treatment time is usually selected from the range between 0.5 hours and 100 hours, preferably 2 hours and 50 hours. By controlling these, the desired viscosity level can be attained. The heat treatment apparatus may be either a usual hot air dryer or a heating apparatus of revolving type or heating apparatus equipped with stirring blades, and the heating apparatus of revolving type or heating apparatus equipped with stirring blades is preferred for the effective and uniform treatment.

An example of the method of heat treatment of the PPS resin under an inert gas atmosphere such as nitrogen or under a reduced pressure is a method wherein the heat treatment is carried out under an inert gas atmosphere such as nitrogen or under a reduced pressure at a heat treatment temperature of 150° C. to 280° C., preferably 200° C. to 270° C. for a heating time of 0.5 to 100 hours, preferably 2 to 50 hours. The heat treatment apparatus may be either a usual hot air dryer or a beating apparatus of revolving type or heating apparatus equipped with stirring blades, and the heating apparatus of revolving type or heating apparatus equipped with stirring blades is preferred for the effective and uniform treatment. To attain the purpose of increasing tensile elongation at break, the PPS resin is preferably a substantially linear PPS whose molecular weight was not increased by a thermal oxidative crosslinking treatment.

The PPS resin used in the present invention preferably contains at least PPS resin subjected to a deionization treatment. Examples of the deionization treatment include washing treatments with an aqueous acid solution, washing treatments with hot water and washing treatments with an organic solvent, and two or more of these treatments may be employed in combination.

As an example of the method of washing treatment of the PPS resin with an organic solvent, the following method may be exemplified: That is, the organic solvent is not particularly limited insofar as it does not have an action of decomposing PPS resin, and examples thereof include nitrogen-containing polar solvents such as N-methyl pyrrolidone, dimethyl formamide, dimethyl acetamide, etc.; sulfoxide and sulfone solvents such as dimethyl sulfoxide, dimethylsulfone, etc.; ketone solvents such as acetone, methyl ethyl ketone, diethyl ketone, acetophenone, etc.; ether solvents such as dimethyl ether, dipropyl ether, tetrahydrofuran, etc.; halogen-based solvents such as chloroform, methylene chloride, trichloroethylene, ethylene dichloride, dichloroethane, tetrachloroethane, chlorobenzene, etc.; alcohol and phenol solvents such as methanol, ethanol, propanol, butanol, pentanol, ethylene glycol, propylene glycol, phenol, cresol, polyethylene glycol, etc.; and aromatic hydrocarbon solvents such as benzene, toluene and xylene. Among these organic solvents, N-methyl pyrrolidone, acetone, dimethyl formamide and chloroform can be particularly preferably used. These organic solvents may be used individually or two or more of them may be used in combination.

The method of washing the PPS resin with an organic solvent includes a method wherein the PPS resin is immersed in an organic solvent, and stirring or heating may be employed as required. The washing temperature when the PPS resin is washed with the organic solvent is not restricted, and an arbitrary temperature may be selected from the range between normal temperature and 300° C. Although the higher the washing temperature, the higher the washing efficiency, a sufficient effect can be usually obtained at a temperature between normal temperature and 150° C. It is preferred to wash the PPS resin several times with water or warmed water after washing with the organic solvent, in order to remove the residual organic solvent.

As an example of the method of washing the PPS resin with hot water, the following method may be exemplified: That is, to obtain the effect of the desired chemical modification of the PPS resin by the washing with hot water, the water used is preferably distilled water or deionized water. The operation of the treatment with hot water is usually carried out by feeding a prescribed amount of PPS resin to a prescribed amount of water, and the mixture is heated and stirred under normal pressure or in a pressurized vessel. As for the mixing ratio of the PPS resin and water, the more the water, the more preferable, and a liquor ratio of not more than 200 g of PPS resin with respect to 1 liter of water is usually selected.

As an example of the method of treating the PPS resin with aqueous acid solution, the following method may be exemplified: That is, the exemplified method is a method wherein the PPS resin is immersed in an acid or an aqueous solution of an acid, and stirring or heating may be employed as required. The acid to be used is not particularly limited insofar as it does not have an action of decomposing PPS resin, and examples of such acid include aliphatic saturated monocarboxylic acids such as formic acid, acetic acid, propionic acid and butyric acid; halogen-substituted aliphatic saturated carboxylic acids such as chloroacetic acid, dichloroacetic acid, etc.; aliphatic unsaturated monocarboxylic acids such as acrylic acid, crotonic acid, etc.; aromatic carboxylic acids such as benzoic acid, salicylic acid, etc.; dicarboxylic acids such as oxalic acid, malonic acid, succinic acid, phthalic acid, fumaric acid, etc.; and inorganic acid compounds such as sulfuric acid, phosphoric acid, hydrochloric acid, carbonic acid and silicic acid. Among these compounds, acetic acid and hydrochloric acid are preferably used. Acid-treated PPS resin is preferably washed several times with water or heated water to remove a residual acid, salt, etc. In order not to adversely affect the effect of the desired chemical modification of the PPS resin by the acid treatment, the water used is preferably distilled water or deionized water. By performing the treatment with an aqueous acid solution, the dispersion of the thermoplastic resin A is promoted presumably because the amount of PPS resin having an acid-terminated end(s) is increased, and the effect of decreasing the average dispersion diameter of the dispersed phase is more easily obtained, which is preferred. However, since the PPS resin subjected to the treatment of washing with an aqueous acid solution (hereinafter also referred to as "acid-terminated PPS resin") has a high melt crystallization temperature, the crystallization proceeds on the casting drum after melt extrusion when the film thickness is large, so that the breakage of the film may occur in the subsequent stretching step and so the film-forming stability may be deteriorated.

On the other hand, in the PPS resin subjected to a washing treatment with an aqueous calcium salt solution such as aqueous calcium acetate solution, a part of the terminal components is thought to be substituted with a Ca-terminated component (the PPS resin is hereinafter also referred to as "Ca-terminated PPS resin"). Since the Ca-terminated PPS resin and the PPS resin not washed with an acid (the PPS resin is hereinafter also referred to as "Na-terminated PPS resin") have a lower melt crystallization temperature and so a smaller crystallization rate than the acid-terminated PPS resin, if they are used as a material in the production of a thick film, the crystallization of the polymer after the melt extrusion is inhibited, which is preferred in some cases. In the present invention, by appropriately adding the Ca-terminated PPS resin and/or Na-terminated PPS resin to the acid-terminated PPS resin and by controlling the mixing ratio thereof a thick film may be obtained desirably in some cases. The ratio of the Ca-terminated PPS resin based on the total PPS resins is preferably not less than 30% by weight and not more than 90% by weight, more preferably not less than 40% by weight and not more than 90% by weight, still more preferably not less than 75% by weight and not more than 90% by weight. If the ratio of Ca-terminated PPS resin is less than 30% by weight, the crystallization of the PPS resin may proceed in cooling after melt extrusion, so that the film breakage may occur in the stretching step or the heat moldability may be deteriorated in some cases. Further, oligomer components may be attached to the casting drum after the melt extrusion or to the stretching rolls for the stretching in the machine direction, so that staining of the rolls may occur in some cases. On the other hand, if the ratio of the Ca-terminated PPS resin is more than 90% by weight, the dispersion of the thermoplastic resin A may be deteriorated in some cases.

Examples of the method of decreasing the oligomer components in the PPS resin include a method wherein preliminary drying before melt extrusion is performed; a method wherein the above-described Ca-terminated PPS is added in a prescribed amount defined in the present invention; and a method wherein a previous melt-kneading (pelletizing) is carried out; and the method wherein the previous kneading (pelletizing) is performed is preferred. Addition of water in the previous melt-kneading is advantageously utilized for decreasing the oligomers. The amount of water to be added in the previous melt-kneading is not restricted, and the amount is preferably not less than 0.1% by weight and not more than 5% by weight, more preferably not less than 0.3% by weight and not more than 3% by weight, still more preferably not less than 0.5% by weight and not more than 1% by weight. If the amount of added water is less than 0.1% by weight, the oligomer components in the material of the melt extrusion may be increased in some cases, and staining of the casting drum in film-formation, staining of wires in applying electrostatic voltage, and staining of rolls for stretching in the machine direction may occur in some cases. If the amount of added water exceeds 5% by weight, clogging of the hopper in the previous kneading (pelletizing) may occur, extrusion stability may be inferior and productivity may be deteriorated in some cases The melt crystallization temperature of the PPS resin can be appropriately adjusted by controlling the ratio of the above-described acid-terminated PPS resin to the Na-terminated and/or Ca-terminated PPS resin. It is important that the biaxially oriented polyarylene sulfide film of the present invention have a melt crystallization temperature of not lower than 155° C. and not higher than 220° C. Preferably, the melt crystallization temperature is not lower than 170° C. and not higher than 220° C., more preferably not lower than 170° C. and not higher than 200° C., most preferably not lower than 170° C. and not higher than 190° C. If the melt crystallization temperature is lower than 155° C., the dispersion of the thermoplastic resin A may be deteriorated in some cases, and if melt crystallization temperature is higher than 220° C., crystallization of the cast film after melt-extrusion, especially in the film edge portions whose thickness is large, may proceed on the cast drum in some cases, and breakage of the film may occur from the crystallized film edge portions in the stretching step, so that the film-forming stability may be deteriorated in some cases.

As for the thermoplastic resin A other than the polyarylene sulfide, which is contained in the biaxially oriented polyarylene sulfide film of the present invention, the glass transition temperature of the thermoplastic resin A is preferably not lower than 150° C. and not higher than the melting point of the polyarylene sulfide from the viewpoint of attaining heat resistance and heat moldability of the biaxially oriented polyarylene sulfide film of the present invention. The glass transition temperature of the thermoplastic resin A is more preferably not lower than 170° C. and not higher than 250° C., still more preferably not lower than 190° C. and not higher than 230° C. If the glass transition temperature of the thermoplastic resin A is lower than 150° C., the heat resistance of the biaxially oriented polyarylene sulfide film may be deteriorated in some cases, and if the glass transition temperature of the thermoplastic resin A is higher than the melting point of the polyarylene sulfide, film-forming property may be deteriorated in some cases. Examples of the thermoplastic resin A having a glass transition temperature of not lower than 150° C. includes various polymers such as polyarylates, polyetherimides, polyethersulfones, polysulfones, polyphenylene ethers, polyamideimides, polycarbonates, polycycloolefins and the like, and blends containing at least one of these polymers. In the present invention, from the viewpoint of mixing property with the polyarylene sulfide and of attaining the effects of the present invention, the thermoplastic resin A is preferably at least one selected from polyetherimides, polyethersulfones and polysulfones. Polyetherimides are especially preferably employed.

It is preferred that the glass transition temperature (Tg) of the biaxially oriented polyarylene sulfide film of the present invention be observed at a temperature not lower than 85° C.

and lower than 95° C., and not observed at a temperature not lower than 95° C. and lower than 135° C. If the Tg is lower than 85° C., the heat resistance of the film is poor. If the Tg is observed at a temperature not lower than 95° C. and not higher than 130° C., the elongation at break under heat may be decreased and the heat moldability may be deteriorated in some cases. The polyetherimide used as the thermoplastic resin A contained in the biaxially oriented polyarylene sulfide film of the present invention is not restricted and examples thereof include the polymers containing the structural unit having an ether bond as shown by the general formula below in the component constituting the polyimide.

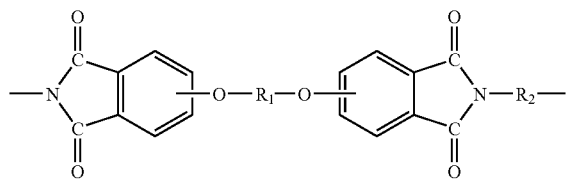

wherein in the above formula, R1 represents a divalent organic group selected from the group consisting of divalent aromatic, aliphatic and alicyclic groups having 2 to 30 carbon atoms; and R2 represents the same divalent organic group as the above-described R.

Examples of the above-described R1 and R2 include the aromatic groups represented by the following formulae:

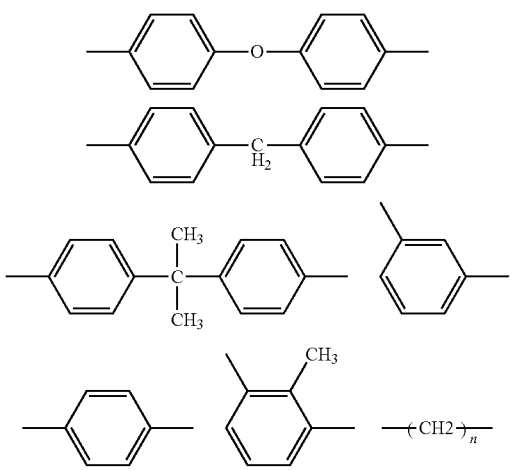

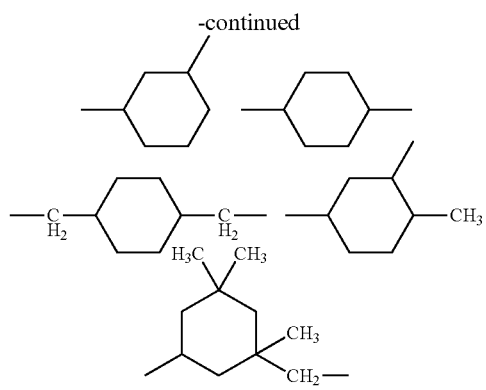

In the present invention, since the effects of the present invention can be easily obtained if a polyetherimide having a glass transition temperature of not higher than 250° C. is used, and also from the viewpoints of compatibility with polyarylene sulfide, melt moldability and so on, the condensate between 2,2-bis[4-(2,3-dicarboxyphenoxy)phenyl]propane dianhydride and m-phenylenediamine or p-phenylenediamine, which has the structural unit represented by the formula below is preferred.

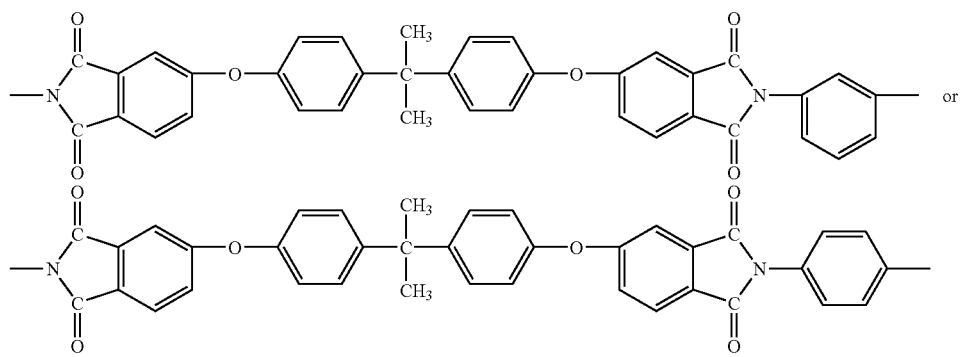

The polyetherimides having these structural units are commercially available from GE Plastics under the trademark "ULTEM" (registered trademark). Examples of the polyetherimide having the structural unit (former formula) originating from m-phenylenediamine include "ULTEM 1000" and "ULTEM 1010". An example of the polyetherimide having the structural unit (latter formula) originating from p-phenylenediamine is "ULTEM CRS5000".

Other examples of the thermoplastic resin A contained in the biaxially oriented polyarylene sulfide film of the present invention include polysulfones and polyethersulfones having sulfur atoms in the molecular skeleton like the polyarylene sulfide. Various known polysulfones and polyethersulfones may be used. From the viewpoint of mixing property with polyarylene sulfide, examples of the end group of the polyethersulfone include chlorine atom, alkoxy groups and phenolic hydroxyl group. As the thermoplastic resin A, polyphenylene ethers and the like having a molecular structure similar to polyarylene sulfide are also preferred examples.

In the present invention, from the viewpoint of promoting dispersion in the polyarylene sulfide resin, the thermoplastic resin A preferably has carboxyl end groups as an end component thereof in an amount of not less than 4 equivalents/t, more preferably not less than 5 equivalents/t.

In the present invention, the heat moldability is promoted by decreasing the breaking stress and increasing the elongation at break under heat. To attain even better heat moldability, it is preferred to add a compatible plasticizer in an amount of 0.05 to 3 parts by weight with respect to 100 parts by weight of the total of the polyarylene sulfide and the thermoplastic resin A, which compatible plasticizer contains at least one group selected from the group consisting of epoxy group, amino group and isocyanate group.

Specific examples of such compatible plasticizer include bisphenol glycidyl ethers such as bisphenol A, resorcinol, hydroquinone, pyrocatechol, bisphenol F, saligenin, 1,3,5-trihydroxybenzene, bisphenol S, trihydroxy-diphenyl dimethyl methane, 4,4'-dihydroxybiphenyl, 1,5-dihydroxynaphthalene, cashew phenol, 2.2.5.5-tetrakis(4-hydroxyphenyl) hexane, etc.; the same compounds as above except that halogenated bisphenol was used in place of bisphenol; glycidyl ether epoxy compounds such as butane diol diglycidyl ether; glycidyl ester compounds such as phthalic glycidyl ester; glycidyl epoxy resins such as glycidyl amine compounds of N-glycidyl aniline, etc.; linear epoxy compounds such as epoxidized polyolefin, epoxidized soybean oil, etc.; and cyclic, non-glycidyl epoxy resin such as vinylcyclohexene dioxide, dicyclopentadiene dioxide, etc. Other novolac-type epoxy resin can also be mentioned. The novolac-type epoxy resin has 2 or more epoxy groups and is obtained usually by reacting epichlorohydrin with novolac-type phenol resin. The novolac-type phenol resin is obtained by condensation reaction of phenols with formaldehyde. The starting phenols are not particularly limited, and examples thereof include phenol, o-cresol, m-cresol, p-cresol, bisphenol A, resorcinol, p-tertiary butyl phenol, bisphenol F, bisphenol S and condensates thereof.

Other olefin copolymers having an epoxy group can also be mentioned. The olefin copolymers having an epoxy group (epoxy group-containing olefin copolymers) include olefin copolymers obtained by introducing a monomer component having an epoxy group into an olefin (co)polymer. A copolymer comprising an olefin polymer having a double bond in its main chain wherein the double bond moiety was epoxidized can also be used.

Examples of functional group-containing components for introducing a monomer component having an epoxy group into an olefin (co)polymer include monomers having an epoxy group, such as glycidyl acrylate, glycidyl methacrylate, glycidyl ethacrylate, glycidyl itaconate and glycidyl citraconate.

The method of introducing the epoxy group-containing component is not particularly limited, and a method of copolymerizing it with α-olefin or a method of grafting it onto an olefin (co)polymer with a radical initiator can be used.

The amount of the epoxy group-containing monomer component introduced is suitably in the range of 0.001 to 40 mol %, preferably 0.01 to 35 mol %, based on the whole of the monomer serving as the starting material of the epoxy group-containing olefin copolymer.

The epoxy group-containing olefin copolymer which is particularly useful in the present invention is preferably an olefin copolymer having an α-olefin and an α,β-unsaturated carboxylic glycidyl ester as copolymer components. The α-olefin is preferably ethylene. The copolymer may be further copolymerized with α,β-unsaturated carboxylic acids and alkyl esters thereof, such as acrylic acid, methyl acrylate, ethyl acrylate, butyl acrylate, methacrylic acid, methyl methacrylate, ethyl methacrylate, butyl methacrylate, etc.; styrene, acrylonitrile, etc.

Such olefin copolymers may be in any modes of random, alternating, block and graft copolymers.

The olefin copolymer having an α-olefin and an α,β-unsaturated carboxylic glycidyl ester copolymerized therein is particularly preferably an olefin copolymer having 60 to 99 wt % α-olefin and 1 to 40 wt % α,β-unsaturated carboxylic glycidyl ester copolymerized therein.

Specific examples of the α,β-unsaturated carboxylic glycidyl ester include glycidyl acrylate, glycidyl methacrylate and glycidyl ethacrylate, among which glycidyl methacrylate is preferably used.

Specific examples of the olefin copolymer having an α-olefin and an α,β-unsaturated carboxylic glycidyl ester indispensably copolymerized therein include ethylene/propylene-g-glycidyl methacrylate copolymer ("g" indicates graft; this hereinafter applies), ethylene/butene-1-g-glycidyl methacrylate copolymers, ethylene-glycidyl methacrylate copolymer-g-polystyrene, ethylene-glycidyl methacrylate copolymer-g-acrylonitrile-styrene copolymers, ethylene-glycidyl methacrylate copolymer-g-PMMA, ethylene/glycidyl acrylate copolymers, ethylene/glycidyl methacrylate copolymers, ethylene/methyl acrylate/glycidyl methacrylate copolymers, and ethylene/methyl methacrylate/glycidyl methacrylate copolymers.

Specific examples of the compatible plasticizer include alkoxysilane having one or more functional groups selected from epoxy group, amino group and isocyanate group. Specific examples of such compounds include epoxy group-containing alkoxysilane compounds such as γ-glycidoxypropyltrimethoxy silane, γ-glycidoxypropyltriethoxy silane, β-(3,4-epoxycyclohexyl)ethyltrimethoxy silane, etc.; ureido group-containing alkoxysilane compounds such as γ-ureidopropyltriethoxy silane, γ-ureidopropyltrimethoxy silane, γ-(2-ureidoethyl)aminopropyltrimethoxy silane, etc.; isocyanato group-containing alkoxysilane compounds such as γ-isocyanatopropyltriethoxy silane, γ-isocyanatopropyltrimethoxy silane, γ-isocyanatopropylmethyldimethoxy silane, γ-isocyanatopropylmethyldiethoxy silane, γ-isocyanatopropylethyldimethoxy silane, γ-isocyanatopropylethyldiethoxy silane, γ-isocyanatopropyl trichlorosilane, etc.; and amino group-containing alkoxysilane compounds such as γ-(2-aminoethyl)aminopropylmethyldimethoxy silane, γ-(2-aminoethyl)aminopropyltrimethoxy silane, γ-aminopropyltrimethoxy silane, etc.

As the compatible plasticizer used in the present invention, the above-described alkoxysilanes having one or more functional groups selected from the group consisting of epoxy group, amino group and isocyanate group are preferred, especially the alkoxysilanes having isocyanate group are most preferred because the amount of large dispersed materials generated by poor dispersion of the dispersed phase in the biaxially oriented polyarylene sulfide film containing thermoplastic resin A can easily be decreased, the average dispersion diameter can be easily controlled within the range preferred in the present invention and the effects of the present invention can easily be obtained.

Further, in cases where an alkoxysilane having at least one functional group selected from epoxy group, amino group and isocyanate group is used, siloxane bonds are likely to be formed between the polyarylene sulfide and the thermoplastic resin A, and the siloxane bonds are likely to exist in the vicinity of the interface of the dispersed phase. Silicon atoms can be detected in the vicinity of the interface of the dispersed phase using TEM-EDX method or the like. In the present invention, it is preferred that silicon (Si) atoms originated from siloxane bonds be contained in the interface of the dispersed phase made of the thermoplastic resin A.

The content of the above-described compatible plasticizer having one or more functional groups selected from the group consisting of epoxy group, amino group and isocyanate group is preferably 0.05 to 3 parts by weight, more preferably 0.1 to 1 part by weight, still more preferably 0.2 to 0.5 parts by weight, taking the total content of the polyarylene sulfide and the thermoplastic resin A as 100 parts by weight. If the content of the compatible plasticizer is less than 0.05 parts by weight, the dispersion of the thermoplastic resin A may be deteriorated and the decrease in the breaking stress and increase in the elongation at break under heat may not be attained in some cases. If the content of the compatible plasticizer is more than 3 parts by weight, a gas may be generated by the reaction of the unreacted end groups of the compatible plasticizer during film-formation, so that film breakage may frequently occur or the elongation at break of the film may be decreased in some cases.

It is most important for attaining the heat moldability in the present invention that the biaxially oriented polyarylene sulfide film of the present invention have a breaking stress at 200° C. in the machine direction and/or transverse direction of the film of not less than 30 MPa and not more than 90 MPa. In the biaxially oriented polyarylene sulfide film of the present invention, by making the breaking stress of the film in one of machine direction and transverse direction be within the range defined in the present invention, the heat moldability in the present invention may be obtained. Needless to say, it is preferred that the average breaking stress in the machine direction and transverse direction be within the range defined in the present invention, and it is more preferred that the breaking stresses in both of the machine direction and transverse direction be within the range defined in the present invention. In the present invention, the breaking stress is preferably not less than 30 MPa and not more than 70 MPa, more preferably not less than 30 MPa and not more than 60 MPa. The breaking stress at 200° C. within the range defined in the present invention can be attained by adding the above-described compatible plasticizer in an amount preferred in the present invention, thereby controlling the average dispersion diameter of the thermoplastic resin A within the range defined in the present invention, and the film having the breaking stress is obtained by the production process according to the present invention described below. If the breaking stress at 200° C. is less than 30 MPa, the heat resistance of the biaxially oriented polyarylene sulfide film may be insufficient in some cases, and if the breaking stress at 200° C. is more than 90 MPa, the problem of film breakage is not improved even in the molding under heat, which may not be acceptable in practice in some cases.

The breaking stress under heat is measured by clamping a cut out sample with a pair of upper and lower chucks of a tensile testing machine of Instron type, which sample was set such that the measurement direction is coincide with the tensile direction; carrying out the tensile test; and measuring the stress when the film sample was broken as the breaking stress. That is, the breaking stress was measured in accordance with the method defined in ASTM-D882, for each sample having a width of 10 mm and a gauge length of 100 mm at a tensile rate of 300 mm/min at various temperatures using a tensile testing machine of Instron type. Ten samples are subjected to the measurement, and the average is defined as the breaking stress.

To attain the heat moldability in the present invention, it is important that the biaxially oriented polyarylene sulfide film of the present invention have an elongation at break at 200° C. in the machine direction and/or transverse direction of the film of not less than 100% and not more than 250%. In the biaxially oriented polyarylene sulfide film of the present invention, by making the elongation at break of the film in one of machine direction and transverse direction be within the range defined in the present invention, the heat moldability in the present invention may be obtained. Needless to say, it is preferred that the average elongation at break in the machine direction and transverse direction be within the range defined in the present invention, and it is more preferred that the elongations at break in both of the machine direction and transverse direction be within the range defined in the present invention. In the present invention, the elongation at break is preferably not less than 120% and not more than 250%, more preferably not less than 130% and not more than 230%, most preferably not less than 150% and not more than 210%. The elongation at break at 200° C. within the range defined in the present invention can be attained by adding the above-described compatible plasticizer in an amount preferred in the present invention, thereby controlling the average dispersion diameter of the thermoplastic resin A within the range defined in the present invention, and the film having the elongation at break is obtained by the production process according to the present invention described below. If the elongation at break at 200° C. is less than 100%, the film may be broken in the processing or in using the film, which may not be acceptable in practice in some cases. To obtain a film having an elongation at break at 200° C. of more than 250%, it is necessary to decrease the draw ratio in the stretching step, so that flatness of the film may be deteriorated or the heat resistance of the film may be insufficient in some cases. In the biaxially oriented polyarylene sulfide film of the present invention, by making the elongation at break of the film in one of machine direction and transverse direction be within the range defined in the present invention, the heat moldability in the present invention may be obtained. It is more preferred that the average elongation at break in the machine direction and transverse direction be within the range defined in the present invention, and it is most preferred that the elongations at break in both of the machine direction and transverse direction be within the range defined in the present invention.

In the present invention, as the method for mixing the polyarylene sulfide, the thermoplastic resin A and the compatible plasticizer, a method is preferred wherein a mixture of the polyarylene sulfide, the thermoplastic resin A and the compatible plasticizer is subjected to previous melt-kneading (pelletizing) using a high shear mixer such as a biaxial extruder by which shearing stress is applied to prepare master chips. In cases where mixing is carried out with a biaxial extruder, from the viewpoint of decreasing the poorly dispersed materials, those having triple biaxial type screw or double biaxial type screw are preferred, and the set cylinder temperature in the kneading section is preferably within the range between 200° C. and 280° C., more preferably between 210° C. and 260° C., still more preferably between 220° C. and 240° C. The temperature of the resin in the kneading section is preferably within the temperature range between 290° C. and 400° C., more preferably between 300° C. and 360° C. By setting the temperature of the kneading section within the preferable temperature range, the shearing stress can be easily increased and the effect to decrease the poorly dispersed materials is promoted, so that the dispersion diameter of the dispersed phase can be controlled within the range preferred in the present invention. The holdup time therein is preferably within the range of 1 to 5 minutes. The screw speed is preferably 100 to 500 rpm, more preferably 200 to 400 rpm. By setting the screw speed within the preferred range, a high shear stress is likely to be given, so that the dispersion diameter of the dispersed phase can be controlled within the range preferred in the present invention. The ratio of the screw shaft length/screw shaft diameter of the biaxial extruder is preferably within the range of 20 to 60, more preferably within the range of 30 to 50.

In the biaxial screw, to increase the kneading force, it is preferred to provide a kneading section(s) using kneading paddles or the like, and the shape of screw having the kneading sections at not less than two sites, more preferably not less than three sites is preferred.

A method wherein a supercritical fluid is used, described in "Seikei-Kakou", vol. 15, No. 6, pp. 382-385 (2003), the Journal of Japan Society of Polymer Processing, or the like is also a preferred example.

The timing of adding the compatible plasticizer is not restricted, and preferred examples include a method wherein the compatible plasticizer is impregnated in the polyarylene sulfide powder and blended with the thermoplastic resin A; and a method wherein the compatible plasticizer is added dropwise from a side feed port when the polyarylene sulfide and the thermoplastic resin A are melt-kneaded. In cases where the compatible plasticizer is added after being blended with polyarylene sulfide, it is preferred to sufficiently carry out moisture control before the previous kneading, by, for example, the polyarylene sulfide is mixed with the compatible plasticizer after removing the moisture attached to the surface of the polyarylene sulfide chips or granules.

As described above, since the dispersive mixing with the thermoplastic resin A is likely to be promoted by using an acid-terminated polyarylene sulfide, it is preferred to prepare master chips in which the thermoplastic resin A is finely dispersed by kneading the acid-terminated polyarylene sulfide, thermoplastic resin A and the compatible plasticizer under high shearing. In this case, to adjust the melt crystallization temperature of the polyarylene sulfide in the final film, it is necessary to add a considerable amount of a polyarylene having a low melt crystallization temperature such as Na-terminated or Ca-terminated polyarylene sulfide. Therefore, it is preferred to make the concentration of the thermoplastic resin A in the above-described master chips be sufficiently higher than the concentration of the thermoplastic resin A in the final film.

Examples of the method for attaining the final film composition include a method wherein the master chips containing a high concentration of the thermoplastic resin A and the polyarylene sulfide having a low melt crystallization temperature are kneaded again under high shearing conditions to prepare material chips for film-formation; and a method wherein the master chips and the polyarylene sulfide having a low melt crystallization temperature are extruded from the film-forming die immediately after applying high shearing to them.

In the present invention, in cases where an alkoxysilane is used as the compatible plasticizer, an alcohol originated from the alkoxysilane may be generated during kneading or extrusion. From the viewpoint of obtaining a resin composition as a material for film-formation, in which the amount of the generating alcohol is small, a method is preferred wherein the polyarylene sulfide, thermoplastic resin A and the compatible plasticizer are once melt-kneaded using a biaxial extruder having at least two kneading sections, and then melt-kneading is carried out again at least once. When carrying out the second or later melt-kneading, it may be preferred to add water in an amount of not less than 0.02 parts, more preferably 0.1 to 5 parts with respect to 100 parts by weight of the total of the polyarylene sulfide and the thermoplastic resin A in some cases. By this method, hydrolysis of the alkoxysilane is enhanced, so that the amount of the alcohol generating from the obtained resin composition can be decreased. It is preferred to remove the alcohol and the like generated by the reaction among the impurities in the polyarylene sulfide or the thermoplastic resin A and the compatible plasticizer from the material chips for film-formation as much as possible for attaining stable film-formation. To attain this, it is preferred to provide a vacuum vent(s) after the kneading zone in the extruder during the melt-kneading. The method for adding water is not restricted, and preferred examples thereof include a method wherein the water is side-fed using a liquid transferring device such as a gear pump or plunger pump from an intermediate site of the extruder; and a method wherein water is blended or side-fed from an intermediate site of the extruder when the material is melt-kneaded once or more after once melt-kneading the material.

Although the cause is not clear at present, biaxially oriented films produced from a material prepared by melt-kneading all components in one step without employing the above-described two-step melt-kneading may have a poor elongation in some cases, so that it may not be preferred in some cases.

The biaxially oriented polyarylene sulfide film of the present invention may contain other component(s) such as a heat stabilizer, antioxidant, ultraviolet absorber, antistatic agent, flame retardant, pigment, dye, organic lubricant such as an aliphatic acid ester or wax and the like in an amount not adversely affecting the effects of the present invention. To give easy lubrication, abrasion resistance, scratch resistance or the like to the film surface, inorganic particles, organic particles or the like may also be added to the biaxially oriented polyarylene sulfide film. Examples of such additives include inorganic particles such as clay, mica, titanium oxide, calcium carbonate, kaolin, talc, wet process or dry process silica, colloidal silica, calcium phosphate, barium sulfate, alumina and zirconia; organic particles containing as constituting components such as acrylates and styrene; the so called internal particles precipitated due to the catalyst added in the polymerization reaction of the polyarylene sulfide; and surfactants.

The thickness of the biaxially oriented polyarylene sulfide film of the present invention differs depending on the use or the like, and is preferably not less than 6 μm and not more than 500 μm, more preferably not less than 20 μm and not more than 500 μm. From the viewpoint of applying the film to a use where thin film is required and of ease of handling, the thickness is more preferably within the range between 20 μm and 300 μm, still more preferably between 20 μm and 200 μm.

The biaxially oriented polyarylene sulfide film of the present invention preferably has a small endothermic peak immediately below the melting point, which endothermic peak is at a temperature not lower than 220° C. and not higher than 280° C., more preferably at a temperature not lower than 240° C. and not higher than 280° C., still more preferably at a temperature not lower than 240° C. and not higher than 260° C. If the small endothermic peak immediately below the melting point is at a temperature higher than 280° C., film breakage may occur during the molding in some cases, and if it is at a temperature lower than 220° C., the thermal contraction of the biaxially oriented film may be increased and the film may deform during heat molding, so that the yield may be decreased in some cases. The small endothermic peak immediately below the melting point is the small endothermic peak emerging before the melting of the crystal in the differential scanning calorimetry (DSC), which is observed at the temperature corresponding to the heat treatment temperature of the film, and which is generated due to the melting of the regions having incomplete structure in the crystal structure formed by the heat treatment.

The biaxially oriented polyarylene sulfide film of the present invention may be subjected to an arbitrary processing(s) such as heat treatment, molding, surface treatment, lamination, coating, printing, emboss treatment and etching, as required.

The use of the biaxially oriented polyarylene sulfide film of the present invention is not restricted, and it may be used for various industrial materials as, for example, an electrical insulating material or molding material in motors, transformers, insulative cables and the like; circuit board material; step or mold releasing film or protective film in circuit or optical parts; a material in lithium ion batteries; a material in fuel cells; speaker diaphragm. More particularly, it may be suitably used as an electrical insulative material in motors of hot water supply equipment; electrical insulative material in motors of car air conditioner used in hybrid cars and the like; as a speaker diaphragm for mobile phones; and so on.

A process for producing the biaxially oriented polyarylene sulfide film of the present invention will now be described, referring to an example wherein polyphenylene sulfide is used as the polyarylene sulfide, polyetherimide is used as the thermoplastic resin A and isocyanate silane is used as the compatible plasticizer to produce a biaxially oriented polyphenyelene sulfide film. However, needless to say, the present invention is not restricted to the following description.

When mixing polyphenylene sulfide, polyetherimide and the compatible plasticizer, a method is preferably exemplified wherein the respective mixtures of each resin are previously melt-kneaded (pelletized) to prepare master chips, respectively, before the melt-extrusion.

In the present invention, first, the pellets or granules of polyphenylene sulfide vacuum-dried at 180° C. for 3 hours or more as required, the compatible plasticizer and the pellets of polyetherimide are mixed at a prescribed ratio, and the mixture is fed to a biaxial melt extruder of vent type, followed by melt-kneading to obtain blend chips. In this case, it is preferred to prepare a blend material having a weight ratio of PPS to polyetherimide of 99/1 to 60/40. As the PPS resin used, an acid-terminated PPS material is preferred. The weight ratio of the compatible plasticizer added is preferably 0.05 to 3 parts by weight with respect to 100 parts by weight of the content of PPS and polyetherimide. The method of mixing and kneading the resin compositions of the blend material is not restricted, and various mixing and kneading methods may be employed. For example, the materials may be separately fed to the melt extruder. Alternatively, only the powdery materials are preliminarily mixed under dry condition using a mixer such as Henschel mixer, ball mixer, blender or tumbler, and then the materials may be melt-kneaded in an melt-kneader. Thereafter, the blend material is fed again to a biaxial kneader together with Ca-terminated PPS resin as required, or together with the recovered raw materials of these materials and water in an amount of 0.1% by weight to 5% by weight as required, thereby obtaining a material having the desired composition. This method is preferred from the viewpoint of promoting the quality of the film and the film-forming properties.

Thereafter, to the resin composition composed of PPS, polyetherimide and isocyanate silane obtained by the above-described kneading operation, particulate master PPS material and/or the recovered raw materials after film-formation is added appropriately at a prescribed ratio as required, and the obtained mixture is fed to an extruder whose melting section is preliminarily heated to a temperature of 300° C. to 350° C., preferably 320° C. to 340° C., after vacuum drying the mixture at 180° C. for 3 hours or more. Thereafter, the melted polymer through the extruder is made to pass through a filter, and the melted polymer is extruded in the form of a sheet by using a T-die. The temperature of the filter section and the die is preferably set to be a temperature higher than the temperature in the melting section of the extruder by 3° C. to 20° C., more preferably by 5° C. to 15° C. By setting the temperature of the filter section and the mouthpiece higher than the melting section of the extruder, abnormal holdup can be reduced, so that the dispersion diameter preferred in the present invention can be attained. The sheet is closely contacted with a cooling drum having a surface temperature of 20° C. to 70° C. to cool and solidify the sheet to obtain an unstretched film in substantially unoriented state.

Then the unstretched film is biaxially stretched to attain biaxial orientation. As the stretching method, a sequential biaxially stretching method (a stretching method wherein the stretchings in one direction are combined, such as a method wherein the film is first stretched in the machine direction and then stretched in the transverse direction), simultaneous stretching method (the film is simultaneously stretched in the machine direction and transverse direction), or a method combining these methods may be employed.

Here, the sequential biaxially stretching method wherein the stretching is performed in the machine direction and then in the transverse direction is described. The stretching temperature varies depending on the PPS and the constituting components of the thermoplastic resin A, and a case using a resin composition containing 95 parts by weight of PPS and 5 parts by weight of polyetherimide will now be described as an example.

For promoting the moldability, it is preferred to heat the unstretched film with a group of heating rolls, and to stretch the film in the machine direction (MD stretching) in one step or in two or more steps at a draw ratio of 2 to 4 times the original length, preferably 2.5 to 3.4 times the original length, still more preferable 2.6 to 3.0 times the original length. On the other hand, from the view point of promotion of moldability and flatness, the draw ratio is preferably 2.8 to 3.2 times the original length, more preferably 3.0 to 3.2 times the original length. The stretching temperature is within the range of Tg (glass transition temperature of PPS) to (Tg+50)° C., preferably (Tg+5)° C. to (Tg+50)° C., more preferably (Tg+5)° C. to (Tg+40)° C., still more preferably (Tg+10)° C. to (Tg+30)° C., most preferably (Tg+15)° C. to (Tg+30)° C. The film is then cooled with a group of cooling rolls at 20° C. to 50° C. To satisfy both the moldability and flatness, it is most preferred to employ a draw ratio of 3.0 to 3.2 times the original length and a stretching temperature of (Tg+15)° C. to (Tg+30)° C.

As the method for stretching in the transverse direction (TD stretching) after the MD stretching, a method using a tenter, for example, is usually employed. The both ends of the film are clamped with clips and the film is introduced into a tenter to carry out the stretching in the transverse direction. The stretching temperature is preferably Tg to (Tg+60)° C., more preferably (Tg+5)° C. to (Tg+50)° C., still more preferably (Tg+10)° C. to (Tg+40)° C. It is preferred to carry out the preheating in the preheating zone before the stretching zone for the TD stretching at a preheating temperature lower than the TD stretching temperature by 3° C. to 10° C., more preferably by 5° C. to 7° C. By setting the preheating temperature before the TD stretching in a preferred range, orientation of the molecular chains can easily be controlled to a range of the present invention without excessively proceeding the crystallization of polyarylene sulfide, so that promotion of elongation at break and moldability which are the effects of the present invention can be easily attained. For promoting the moldability, the draw ratio is preferably 2 to 4 times the original length, more preferably 2,4 to 3.0 times the original length, still more preferably 2.6 to 2.8 times the original length. On the other hand, from the viewpoint of promoting moldability, flatness and productivity, the draw ratio is preferably 3.0 to 4.0 times the original length, more preferably 3.3 to 3.7 times the original length. To satisfy both the moldability and flatness, it is most preferred to employ a draw ratio of 3.3 to 3.7 times the original length, and a stretching temperature of (Tg+10)° C. to (Tg+40)° C.

Then the stretched film is heat-set under tension. The heat-set temperature is preferably 200° C. to 280° C., more preferably 240° C. to 280° C., still more preferably 260° C. to 280° C., and the heat-set time is preferably 1 to 100 seconds, preferably 1 to 60 seconds, still more preferably 1 to 30 seconds. If the heat-set temperature is lower than 200° C., the film is contracted by heat and is deformed in the molding under heat, so that the yield may be decreased in some cases. On the other hand, if the heat-set temperature is higher than 280° C., the crystallization of the film and the mechanical strength may be promoted or the elongation at break may be decreased in some cases, and the heat moldability may be deteriorated due to film breakage in the molding in some cases.

From the view point of promoting the flatness of the film, it is preferred to carry out the heat-set in two or more steps at different temperatures. The heat-set temperature in the first step is preferably 160° C. to 240° C., more preferably 160° C. to 220° C., still more preferably 160° C. to 200° C. The heat-set time in the first step is 1 to 100 seconds, preferably 1 to 60 seconds, still more preferably 1 to 10 seconds. The maximum heat-set temperature in the later steps is preferably not lower than the heat-set temperature in the first step and within the range between 220° C. and 280° C., more preferably a temperature not lower than (heat-set temperature in the first step+20° C.) and within the range between 240° C. and 280° C. The heat-set time in a later step is 1 to 100 seconds, preferably 1 to 60 seconds, still more preferably 1 to 10 seconds, and the overall heat-set time is not longer than 200 seconds, preferably not longer than 120 seconds, still more preferably not longer than 20 seconds.

The film is then subjected to relaxing treatment in the transverse direction at a temperature not lower than 150° C. and not higher than the melting point of polyarylene sulfide, more preferably not lower than 200° C. and not higher than the melting point of polyarylene sulfide. The relax ratio is preferably 0.1% to 10%, more preferably 2% to 8%, still more preferably 2% to 7%. The relaxing is carried out at the above-described temperature range for a relaxing treatment time of 1 to 100 seconds, preferably 1 to 60 seconds, still more preferably 1 to 10 seconds. If the relaxing temperature is lower than 150° C., the film cannot be contracted by the amount of the relax ratio, so that the flatness of the film may be deteriorated in some cases. If the relaxing temperature is higher than the melting point of polyarylene sulfide, crystallization of the film proceeds and heat moldability may be deteriorated in some cases.

Then the film is cooled to room temperature and wound white, if necessary, carrying out the relaxing treatment in the machine direction and transverse direction to obtain the desired biaxially oriented polyarylene sulfide film.

The methods for measuring characteristics and for evaluating the effects of the present invention are as follows:
(1) Average Dispersion Diameter of Dispersed Phase A film was cut by the ultra-thin cutting method (a) in the direction parallel to the machine direction and perpendicular to the film surface, (b) in the direction parallel to the transverse direction and perpendicular to the film surface, and (c) in the direction parallel to the film surface, to prepare samples. To make clear the contrast of the dispersed phase, the sample may be stained with osmic acid, ruthenium acid, phosphotungstic acid or the like. In cases where the thermoplastic resin A was a polyamide, the staining with phosphotungstic acid was suitably used. The cut face was observed using a transmission electron microscope (type H-7100FA produced by HITACHI) at an acceleration voltage of 100 kV, and photographs were taken at a magnification of ×20,000. Each of the taken photographs was captured by an image analyzer as an image, and arbitrary 100 dispersed phase regions were selected, followed by image processing as required to determine the size of the dispersed phase regions as described below. In cases where the number of the dispersed phase regions is less than 100 in one image, 100 dispersed phase regions can be selected observing a different cut face obtained by cutting the film in the same direction. The maximum length (la) of each dispersed phase region emerging in the cut face (a) in the direction of the thickness of the film and the maximum length (lb) in the machine direction; the maximum length (le) of each dispersed phase region emerging in the cut face (b) in the direction of the thickness of the film and the maximum length (ld) in the transverse direction; and the maximum length (le) of each dispersed phase region emerging in the cut face (c) in the machine direction of the film and the maximum length (lf) in the transverse direction were measured. Then the average dispersion diameter of the dispersed phase was calculated as (I+J+K)/3 wherein Shape Factor I of Dispersed Phase=(number average of lb+number average of le)/2; Shape Factor J=(number average of ld+number average of lf)/2; Shape Factor K=(number average of la+number average of lc)/2.

(2) Glass Transition Temperature (Tg), Melting Temperature (Tm), Melt Crystallization Temperature (Tmc), Small Endothermic Peak Immediately Below Melting Point (Tmeta)

In accordance with JIS K7121, glass transition temperature (Tg) was measured as follows using temperature modulation DSC produced by A Instrument:
Measurement Conditions
  Heating Temperature: 270-570K (RCS cooling method)
  Temperature Calibration: melting points of high purity indium and tin
  Temperature Modulation Amplitude; ±1K
  Temperature Modulation Period: 60 seconds
  Temperature Increment: 5K
  Sample Weight: 5 mg
  Sample Vessel: open vessel made of aluminum (22 mg)
  Reference Vessel: open vessel made of aluminum (18 mg)
  The glass transition temperature (Tg) was calculated according to the following equation:

> Glass Transition Temperature=Extrapolated Temperature at which Glass Transition Starts+Extrapolated Temperature at which Glass Transition Terminate)/2

Using as the differential scanning calorimeter, DSC (RDC220) produced by Seiko Instruments, and using as a data processing apparatus, Disc Station (SSC/5200) produced by the same company, 5 mg of a sample was heated from the room temperature to 350° C. at a heating rate of 20° C./min on a receiving plate made of aluminum. The peak temperature of the endothermic peak due to melting observed therein was defined as the melting temperature (Tm), and the small endothermic peak immediately below Tm was defined as Tmeta.

Further, 5 mg of a sample was heated from the room temperature to 350° C. at a heating rate of 20° C./min on a receiving plate made of aluminum, kept at 350° C. for 5 minutes under melted condition, and cooled from 350° C. to room temperature at a rate of 20° C./min. The temperature of the exothermic peak observed therein was defined as melt crystallization temperature (Tmc).

(3) Breaking Strength and Elongation at Brea

These were measured by the method in accordance with ASTM-D882 using a tensile testing machine of Instron type. The measurement was carried out under the following conditions for 10 samples, and the average thereof was employed.

Measuring Apparatus: automatic film strength and elongation measuring apparatus
"Tensilon AMF/RTA-100" produced by Orientec
Sample Size: width 10 mm×gauge length 100 mm
Tensile Rate: 300 mm/min.
Measuring Environment: temperature 200° C.

(4) Heat Moldability

With a die having a deep drawing portion with which the film can be bent at an angle of 180°, the film was mold-pressed at 200° C., under a pressure of 0.4 MPa for 15 seconds. Then the film was cooled to 100° C., and the sample was taken out to room temperature. One thousand samples were prepared, and the number of generated breakages and cracks was counted. The results were evaluated as follows:

<Heat Moldability>

⊚: The number of generated breakages and cracks was less than 50.

○: The number of generated breakages and cracks was 50 to 100.

Δ: The number of generated breakages and cracks was 100 to 200.

×: The number of generated breakages and cracks was more than 200.

(5) Flatness

After the film-formation and heat-set, a surface treatment is performed and 100 samples of the obtained biaxially oriented film sizing A4 size are arbitrarily selected. A cotton swab impregnated with water is placed on the central portion of the surface-treated film surface such that the cotton swab is slanted as much as possible, and the cotton swab is moved by 10 cm. The tip portion of the cotton swab was completely immersed in water, and the cotton swab was exchanged per 1 sheet of sample. The surfaces of the resulting samples were evaluated according to the following criteria:

○: The surfaces of not less than 90 sheets are wetted without repelling water.

Δ: The surfaces of 90 to 50 sheets are wetted without repelling water.

×: The number of sheets whose surface is wetted without repelling water is less than 50.

(6) Attachment of Oligomers

After film-formation at an ejection rate of 100 kg/hour for 12 hours, the first and second preheating rolls heated at 92° C. for stretching in the machine direction were wiped with a bleached cotton impregnated with water, and the results were judged according to the following criteria:

⊚: Coloring by attachment of oligomers was not observed on any of the preheating rolls.

○: Coloring by attachment of oligomers was on the first preheating roll but not observed on the second preheating roll.

Δ: Coloring by attachment of oligomers was observed on the first and second preheating rolls.

×: Much oligomers were attached to the first preheating roll, and the coloring by the attachment of the oligomers was also observed on the second preheating roll.

(8) Melt Viscosity

Using Flow Tester CFT-500 (manufactured by Shimadzu Corporation), measurement was carried out with a die of 10 mm in length, a die diameter of 1.0 mm, 310° C., for a preheating time of 5 minutes, and for a shear rate of 1,000/s.

EXAMPLES

Reference Example 1

Polymerization of an acid-terminated PPS (PPS-1)

Into a 70L autoclave provided with a stirrer, 8,267.37 g of 47.5% sodium hydrosulfide (70.00 moles), 2,957.21 g of 96% Sodium hydroxide (70.97 moles), 11,434.50 g of N-methyl-2-pyrrolidone (NMP) (115.50 moles), 2,583.00 g of sodium acetate (31.50 moles) and 10,500 g of ion-exchanged water were added. The resulting mixture was then slowly heated to 245° C. for about 3 hours under atmospheric pressure under nitrogen gas flow, thereby distilling 14,780.1 g of water and 280 g of NMP, and the reaction vessel was cooled to 160° C. The residual amount of water in the system per 1 mole of the supplied alkali metal sulfide was 1.06 moles including the water consumed for hydrolysis of NMP. The amount of hydrogen sulfide scattered was 0.02 mole per 1 mole of the supplied alkali metal sulfide.

Subsequently, 10,235.46 g (69.63 moles) of p-dichlorobenzene and 9,009.00 g (91.00 moles) of NMP were added, and the reaction vessel was hermetically sealed under nitrogen gas. The mixture was heated to 238° C. at a rate of 0.6° C./min. under stirring at 240 rpm After reacting at 238° C. for 95 minutes, it was heated to 270° C. at a rate of 0.8° C./min. After reacting at 270° C. for 100 minutes, it was cooled to 250° C. at a rate of 1.3° C./min while injecting 1,260 g (70 moles) of water thereto for 15 minutes. The mixture was then cooled to 200° C. at a rate of 1.0° C./min. and was subsequently cooled rapidly to about room temperature.

After removal of the content and dilution thereof with 26,300 g of NMP, the solids were separated from the solvent by filtration with a screen (80-mesh), and the obtained particles were washed with 31,900 g of NMP, followed by removal by filtration. After several times of washing with 56,000 g of ion-exchanged water and removal by filtration, the particles were washed with 70,000 g of 0.05% by weight of aqueous acetic acid solution and were removed by filtration. The particles were then washed with 70,000 g of ion-exchanged water and were removed by filtration, followed by hot-air drying of the resulting hydrated PPS particles at 80° C. and the subsequent drying thereof under reduced pressure at 120° C. The obtained PPS resin showed a melt viscosity of 200 Pa·s (310° C., with a shear rate of 1,000/s), a glass transition temperature of 90° C., a melting point of 280° C., and a melt crystallization temperature of 230° C.

Reference Example 2

Polymerization of a Ca-Terminated PPS resin (PPS-2)

A PPS resin was produced in the same manner as in Reference Example 1 except that an aqueous calcium acetate solution was used instead of the aqueous acetic acid solution in Reference Example 1. The obtained PPS resin showed a melt viscosity of 200 Pa·s (310° C., with a shear rate of 1,000/s), a glass transition temperature of 90° C., a melting point of 280° C., and a melt crystallization temperature of 175° C.

Reference Example 3

Preparation of PPS/PEI Blended Chips

After blending 70 parts by weight of the acid-terminated PPS resin prepared in Reference Example 1 and, as the thermoplastic resin A, 30 parts by weight of polyetherimide (ULTEM 1010, produced by GE Plastics) (PEI) (glass transition temperature, 215° C.), vacuum drying was carried out at 180° C. for not less than 3 hours. Subsequently, 1.5 parts by weight of γ-isocyanatepropyltriethoxysilane ("KBE9007", produced by Shin-Etsu Chemical) was blended as a compatible plasticizer to a total of 100 parts by weight of the PPS resin and the polyetherimide. This resulting mixture was fed to a co-rotating biaxial kneading extruder equipped with three kneading sections having kneading paddles and with a vent (produced by Nihon Seiko Co., Ltd., screw diameter 30 mm, screw length/screw diameter=45.5), which was heated to 230° C. The mixture was then melt-extruded with a holdup time of 90 seconds and a screw rotation speed of 300 rpm, and was ejected in a strand-like shape. The resultant was cooled with water at a temperature of 25° C. and was then cut immediately to produce PPS/PEI (70/30% by weight) blended chips.

Example 1

To 33 parts by weight of the PPS/PEI (70/30% by weight) blended chips prepared in Reference Example 3, 67 parts by weight of the Ca-terminated PPS resin prepared in Reference Example 2 and 0.3 part by weight of calcium carbonate particle having an average particle diameter of 1.2 μm were blended. After drying under reduced pressure at 180° C. for 3 hours, the mixture was supplied to a full flight uniaxial extruder whose melting section was heated to 320° C. The polymer melted in the extruder was filtered with a filter which was set to a temperature of 330° C. and was melt-extruded by using a T-die which was set to a temperature of 330° C. The resulting polymer was cooled and solidified by close contact with the casting drum whose surface temperature was 25° C. and to which static electricity was kept applied, to produce an unstretched film.

This unstretched film was stretched at a temperature of 108° C. in the machine direction of the film at a ratio of 2.6 using a longitudinal stretching machine comprising multiple heated rolls, utilizing the difference in peripheral speed among the rolls. The both sides of this film were then held with clips, and the film was guided to a tenter and was stretched at a drawing temperature of 100° C. at a draw ratio of 2.8 in the transverse direction of the film, followed by heat-treatment at 280° C. for 20 seconds. The resulting film was then subjected to 4% relaxing treatment in the transverse direction in a cooling zone controlled to be 150° C., and was cooled to room temperature, followed by removal of the film edge to produce a biaxially oriented PPS film having a thickness of 25 μm.

The results of measurement and evaluation of the constitution and characteristics of the obtained biaxially oriented PPS film are as shown in Table 1, demonstrating superiority of this biaxially oriented PPS film in terms of a low breaking stress at 200° C., a high elongation at break at 200° C. and absence of film breakage and cracking in beat molding.

Example 2

PPS/PEI (70/30% by weight) blended chips were produced in the same manner as in Reference Example 3 except that 2 parts by weight of γ-isocyanatepropyltriethoxysilane ("KBE9007", produced by Shin-Etsu Chemical) was blended as a compatible plasticizer.

PPS/PEI (95/5% by weight) blended chips were produced in the same manner as in Example 1 except that 83 parts by weight of the Ca-terminated PPS resin prepared in Reference Example 2 and 0.3 part by weight of calcium carbonate particle having an average particle diameter of 1.2 μm were blended to 17 parts by weight of the obtained PPS/PEI (70/30% by weight) blended chips.

After drying under reduced pressure at 180° C. for 3 hours, the obtained PPS/PEI (95/5% by weight) blended chips were supplied to a full flight uniaxial extruder whose melting section was heated to 320° C. The polymer melted in the extruder was filtered with a filter which was set to a temperature of 330° C., and was melt-extruded by using a T-die which was set to a temperature of 330° C. The resulting polymer was cooled and solidified by close contact with the casting drum whose surface temperature was 25° C. and to which static electricity was kept applied, to produce an unstretched film.

This unstretched film was stretched at a temperature of 108° C. in the machine direction of the film at a draw ratio of 2.8 using a longitudinal stretching machine comprising multiple heated rolls, utilizing the difference in peripheral speed among the rolls. The both sides of this film were then held with clips, and the film was guided to a tenter and was stretched at a drawing temperature of 100° C. at a draw ratio of 2.8 in the transverse direction of the film, followed by heat-treatment at 280° C. for 20 seconds. The resulting film was then subjected to 4% relaxing treatment in the transverse direction in a cooling zone controlled to be 150° C., and was cooled to room temperature, followed by removal of the film edges to produce a biaxially oriented PPS film having a thickness of 25 μm.

The results of measurement and evaluation of the constitution and characteristics of the obtained biaxially oriented PPS film are as shown in Table 1, demonstrating superiority of this biaxially oriented PPS film in terms of a low breaking stress at 200° C., a high elongation at break at 200° C. and absence of film breakage and cracking in heat molding.

Example 3

PPS/PEI (15% by weight) blended chips were produced in the same manner as in Example 1 except that 50 parts by weight of the Ca-terminated PPS resin prepared in Reference Example 2 and 0.3 part by weight of calcium carbonate particle having an average particle diameter of 1.2 μm were blended to 50 parts by weight of the PPS/PEI (70/30% by weight) blended chips prepared in Reference Example 3, to produce a biaxially oriented PPS film.

The results of measurement and evaluation of the constitution and characteristics of the obtained biaxially oriented PPS film are as shown in Table 1, demonstrating that this biaxially oriented PPS film shows improvement in a breaking stress and an elongation at break at 200° C. as well as decreased film breakage and cracking in beat molding.

Example 4

A biaxially oriented PPS film was produced in the same manner as in Example 1 except that the draw ratio was 2.8 for the machine direction and was 2.8 for the transverse direction in Example 1.

The results of measurement and evaluation of the constitution and characteristics of the obtained biaxially oriented PPS film are as shown in Table 1, demonstrating that this biaxially oriented PPS film shows improvement in a breaking stress and an elongation at break at 200° C. as well as decreased film breakage and cracking in heat molding.

Example 5

A biaxially oriented PPS film was produced in the same manner as in Example 1 except that the draw ratio was 3.0 for the machine direction and was 3.0 for the transverse direction in Example 1.

The results of measurement and evaluation of the constitution and characteristics of the obtained biaxially oriented PPS film are as shown in Table 1, demonstrating that this biaxially oriented PPS film shows improvement in a breaking stress and an elongation at break at 200° C. as well as decreased film breakage and cracking in heat molding.

Example 6

A biaxially oriented PPS film was produced in the same manner as in Example 2 except that the draw ratio was 3.0 for the machine direction and was 3.0 for the transverse direction in Example 2.

The results of measurement and evaluation of the constitution and characteristics of the obtained biaxially oriented PPS film are as shown in Table 1, demonstrating that this biaxially oriented PPS film shows improvement in a breaking stress and an elongation at break at 200° C. as well as decreased film breakage and cracking in heat molding.

Example 7

A biaxially oriented PPS film was produced in the same manner as in Example 2 except that the draw ratio was 3.2 for the machine direction and was 3.2 for the transverse direction in Example 2.

The results of measurement and evaluation of the constitution and characteristics of the obtained biaxially oriented PPS film are as shown in Table 1, demonstrating that this biaxially oriented PPS film shows improvement in a breaking stress and an elongation at break at 200° C. as well as decreased film breakage and cracking in heat molding.

Example 8

After blending 23 parts by weight of an acid-terminated PPS resin, 67 parts by weight of a Ca-terminated PPS resin and, as the thermoplastic resin A, 10 parts by weight of polyetherimide (ULTEM 1010, produced by GE Plastics) (PEI) (glass transition temperature, 215° C.), 0.5 part by weight of γ-isocyanatepropyltriethoxysilane ("KBE9007", produced by Shin-Etsu Chemical) was blended as a compatible plasticizer to a total of 100 parts by weight of the PPS resins and the polyetherimide. Subsequently, 0.3 part by weight of calcium carbonate particle having an average particle diameter of 1.2 μm was blended thereto. The resulting mixture was fed to a co-rotating biaxial kneading extruder equipped with three kneading sections having kneading paddles and with a vent (produced by Nihon Seiko Co., Ltd., screw diameter 30 mm, screw length/screw diameter=45.5), which was heated to 230° C. The mixture was then melt-extruded with a holdup time of 90 seconds and a screw rotation speed of 300 rpm, and was ejected in a strand-like shape. The resultant was cooled with water at a temperature of 25° C. and was then cut immediately to produce PPS/PEI (90/10% by weight) blended chips.

From the obtained PPS/PEI (90/10% by weight) blended chips, a biaxially oriented PPS film was produced in the same manner as in Example 1.

The results of measurement and evaluation of the constitution and characteristics of the obtained biaxially oriented PPS film are as shown in Table 1, demonstrating that this biaxially oriented PPS film shows improvement in a breaking stress and an elongation at break at 200° C. as well as decreased film breakage and cracking in heat molding.

Example 9

A biaxially oriented PPS film was produced in the same manner as in Example 2 except that the amount of γ-isocyanatepropyltriethoxysilane ("KBE9007", produced by Shin-Etsu Chemical) blended as the compatible plasticizer was 0.7 part by weight for a total of 100 parts by weight of the PPS resin and the polyetherimide.

The results of measurement and evaluation of the constitution and characteristics of the obtained biaxially oriented PPS film are as shown in Table 1, demonstrating that this biaxially oriented PPS film shows improvement in a breaking stress and an elongation at break at 200° C. as well as decreased film breakage and cracking in heat molding.

Example 10

A biaxially oriented PPS film was produced in the same manner as in Example 2 except that the amount of γ-isocyanatepropyltriethoxysilane ("KBE9007", produced by Shin-Etsu Chemical) blended as the compatible plasticizer was 0.15 part by weight for a total of 100 parts by weight of the PPS resin and the polyetherimide.

The results of measurement and evaluation of the constitution and characteristics of the obtained biaxially oriented PPS film are as shown in Table 1, demonstrating that this biaxially oriented PPS film shows improvement in a breaking stress and an elongation at break at 200° C. as well as decreased film breakage and cracking in heat molding.

Example 11

A biaxially oriented PPS film was produced in the same manner as in Example 2 except that the compatible plasticizer, which was blended to a total of 100 parts by weight of the PPS resin and the polyetherimide, was a bisphenol A type epoxy resin ("Epikote" 1004, produced by Yuka Shell Epoxy K. K.).

The results of measurement and evaluation of the constitution and characteristics of the obtained biaxially oriented PPS film are as shown in Table 1, demonstrating that this biaxially oriented PPS film shows an increased average dispersion diameter of the polyetherimide resin as well as decrease in a breaking stress and of improvement in an elongation at break at 200° C.

Example 12

A biaxially oriented PPS film was produced in the same manner as in Example 2 except that polyethersulfone ("RADEL" A-200A, produced by Amoco) (PES) (glass transition temperature, 225° C.) was used as the thermoplastic resin A.

The results of measurement and evaluation of the constitution and characteristics of the obtained biaxially oriented PPS film are as shown in Table 1, demonstrating that this biaxially oriented PPS film shows an increased average dispersion diameter of the polyethersulfone resin as well as decrease in a breaking stress and of improvement in an elongation at break at 200° C.

Example 13

A biaxially oriented PPS film was produced in the same manner as in Example 2 except that polysulfone ("UDEL" P-1700, produced by Amoco) (PSF) (glass transition temperature, 190° C.) was used as the thermoplastic resin A.

The results of measurement and evaluation of the constitution and characteristics of the obtained biaxially oriented PPS film are as shown in Table 1, demonstrating that this biaxially oriented PPS film shows an increased average dispersion diameter of the polysulfone resin as well as decrease in a breaking stress and of improvement in an elongation at break at 200° C.

Example 14

A biaxially oriented PPS film was produced in the same manner as in Example 2 except that thickness of the film was 120 μm in Example 2. The result of evaluation of the constitution and characteristics of the obtained biaxially oriented PPS film is as shown in Table 1, demonstrating superiority of this biaxially oriented PPS film in terms of a low breaking stress at 200° C., a high elongation at break at 200° C. and absence of film breakage and cracking in heat molding.

Example 15

PPS/PEI (95/5% by weight) blended chips were produced in the same manner as in Example 1 except that 57 parts by weight of the Ca-terminated PPS resin prepared in Reference Example 2 was blended to 43 parts by weight of the PPS/PEI (88/12% by weight) blended chips in Example 2.

From the obtained PPS/PET (95/5% by weight) blended chips, a biaxially oriented PPS film having a thickness of 25 μm was produced in the same manner as in Example 2.

The results of measurement and evaluation of the constitution and characteristics of the obtained biaxially oriented PPS film are as shown in Table 1, demonstrating superiority of this biaxially oriented PPS film in terms of a low breaking stress at 200° C., a high elongation at break at 200° C. and absence of film breakage and cracking in heat molding.

Example 16

PPS/PEI (95/5% by weight) blended chips were produced in the same manner as in Example 1 except that 33 parts by weight of the Ca-terminated PPS resin prepared in Reference Example 2 was blended to 67 parts by weight of the PPS/PEI (93/7% by weight) blended chips in Example 2.

From the obtained PPS/PEI (95/5% by weight) blended chips, a biaxially oriented PPS film having a thickness of 25 μm was produced in the same manner as in Example 2.

The results of measurement and evaluation of the constitution and characteristics of the obtained biaxially oriented PPS film are as shown in Table 1, demonstrating that this biaxially oriented PPS film shows improvement in a breaking stress and an elongation at break at 200° C. as well as decreased film breakage and cracking in heat molding.

Example 17

A biaxially oriented PPS film was produced in the same manner as in Example 2 except that the longitudinal draw ratio was 3.2 and the transverse draw ratio was 3.5 in Example 2. The results of measurement and evaluation of the constitution and characteristics of the obtained biaxially oriented PPS film are as shown in Table 1, demonstrating that this biaxially oriented PPS film shows improvement in a breaking stress and an elongation at break at 200° C. as well as decreased film breakage and cracking in heat molding.

Example 18

A biaxially oriented PPS film was produced in the same manner as in Example 2 except that the transverse draw ratio was 3.7 in Example 2. The results of measurement and evaluation of the constitution and characteristics of the obtained biaxially oriented PPS film are as shown in Table 1, demonstrating that this biaxially oriented PPS film shows improvement in a breaking stress and an elongation at break at 200° C. as well as decreased film breakage and cracking in heat molding.

Example 19

A biaxially oriented PPS film was produced in the same manner as in Example 2 except that, following film-forming heat-set, surface treatment was carried out during film-forming in Example 2. The results of measurement and evaluation of the constitution and characteristics of the obtained biaxially oriented PPS film are as shown in Table 2, demonstrating that this biaxially oriented PPS film shows improvement in a breaking stress and an elongation at break at 200° C. as well as excellent heat molding, whereas shows insufficiency of wettability in the central part of the formed film as indicated by the result of flatness evaluation.

Example 20

A biaxially oriented PPS film was produced by conducting heat-set and the subsequent surface treatment in the same manner as in Example 19 except that, in Example 19, in the heat-set after drawing in the transverse direction, the first step heat-set at 200° C. for 5 seconds and the subsequent second step heat-set at 280° C. for 5 seconds were carried out followed by a 5% limited contraction (relaxing) treatment in the transverse direction for 4 seconds at 260° C. The results of measurement and evaluation of the constitution and characteristics of the obtained biaxially oriented PPS film are as shown in Table 2, demonstrating that this biaxially oriented PPS film shows improvement in a breaking stress and an elongation at break at 200° C. as well as superiority in heat molding, in addition to an improved flatness.

Example 21

A biaxially oriented PPS film was produced by conducting heat-set and the subsequent surface treatment in the same manner as in Example 19 except that in the heat-set after drawing in the transverse direction, the first step heat-set at 200° C. for 5 seconds and the subsequent second step heat-set at 265° C. for 5 seconds were carried out followed by a 5% limited contraction (relaxing) treatment in the transverse direction for 4 seconds at 260° C. The results of measurement and evaluation of the constitution and characteristics of the obtained biaxially oriented PPS film are as shown in Table 2, demonstrating that this biaxially oriented PPS film shows improvement in a breaking stress and an elongation at break at 200° C. as well as superiority in heat molding, in addition to an improved flatness.

Example 22

PPS/PEI (95/5% by weight) blended chips were produced in the same manner as in Example 2 except that 83 parts by weight of the Ca-terminated PPS resin prepared in Reference Example 2, 1 part by weight of water and 0.3 part by weight of calcium carbonate particle having an average particle diameter of 1.2 μm were blended to 17 parts by weight of the PPS/PEI (70/30% by weight) blended chips obtained in Example 2.

From the obtained PPS/PEI (95/5% by weight) blended chips, a biaxially oriented PPS film was produced in the same manner as in Example 21. The results of measurement and evaluation of the constitution and characteristics of the obtained biaxially oriented PPS film are as shown in Table 2, demonstrating that this biaxially oriented PPS film shows improvement in a breaking stress and an elongation at break at 200° C., superiority in heat molding and flatness, and a decrease, compared to Example 21, in the level of attachment of oligomers to the preheating rolls for longitudinal stretching.

Comparative Example 1

The Ca-terminated PPS resin obtained in Reference Example 2 was dried in vacuum at 180° C. for not less than 3 hours, and was subsequently supplied to a full flight uniaxial extruder whose melting section was heated to 320° C. The polymer melted in the extruder was filtered with a filter which was set to a temperature of 330° C. and was melt-extruded by using a T-die which was set to a temperature of 330° C. The resulting polymer was cooled and solidified by close contact with the casting drum whose surface temperature was 25° C. and to which static electricity was kept applied, to produce an unstretched film.

This unstretched film was stretched in the machine direction of the film at a temperature of 108° C. at a draw ratio of 3.8 using a longitudinal stretching machine comprising multiple heated rolls, utilizing the difference in peripheral speed among the rolls. The both sides of this film were then held with clips, and the film was guided to a tenter and was stretched in the transverse direction of the film at a drawing temperature of 100° C. at a draw ratio of 3.6, followed by heat-treatment at 280° C. for 20 seconds. The resulting film was then subjected to 4% relaxing treatment in the transverse direction in a cooling zone controlled to be 150° C., and was cooled to room temperature, followed by removal of the film edges to produce a biaxially oriented PPS film having a thickness of 25 μm.

The results of measurement and evaluation of the constitution and characteristics of the obtained biaxially oriented PPS film are as shown in Table 1, demonstrating a high breaking stress and a low elongation at break at 200° C., which frequently caused film breakage in heat molding.

Comparative Example 2

PPS/PEI (90/10% by weight) blended chips were produced in the same manner as in Reference Example 3 except that 90 parts by weight of the acid-terminated PPS resin prepared in Reference Example 1 and, as the thermoplastic resin A, 10 parts by weight of polyetherimide (ULTEM 1010, produced by GE Plastics) (PEI) (glass transition temperature, 215° C.) were blended and that 2 parts by weight of γ-isocyanatepropyltriethoxysilane ("KBE9007", produced by Shin-Etsu Chemical) was blended to a total of 100 parts by weight of the PPS resin and the polyetherimide as a compatible plasticizer.

To 5 parts by weight of the obtained PPS/PEI (90/10% by weight) blended chips, 95 parts by weight of the Ca-terminated PPS resin prepared in Reference Example 2 and 0.3 part by weight of calcium carbonate particle having an average particle diameter of 1.2 μm were blended. The resulting blended chips were dried in vacuum at 180° C. for 3 hours, and were subsequently supplied to a fall flight uniaxial extruder whose melting section was heated to 320° C. The polymer melted in the extruder was filtered with a filter which was set to a temperature of 330° C. and was melt-extruded by using a T-die which was set to a temperature of 330° C. The resulting polymer was cooled and solidified by close contact with the casting drum whose surface temperature was 25° C. and to which static electricity was kept applied, to produce an unstretched film.

This unstretched film was stretched at a temperature of 108° C. in the machine direction of the film at a ratio of 3.8 using a longitudinal stretching machine comprising multiple heated rolls, utilizing the difference in peripheral speed among the rolls. The both sides of this film were then held with clips, and the film was guided to a tenter and was stretched at a drawing temperature of 100° C. at a draw ratio of 3.6 in the transverse direction of the film, followed by heat-treatment at 280° C. for 20 seconds. The resulting film was then subjected to 4% relaxing treatment in the transverse direction in a cooling zone controlled to be 150° C., and was cooled to room temperature, followed by removal of the film edges to produce a biaxially oriented PPS film having a thickness of 25 μm.

The results of measurement and evaluation of the constitution and characteristics of the obtained biaxially oriented PPS film are as shown in Table 1, demonstrating a high breaking stress and a low elongation at break thereof at 200° C., which frequently caused film breakage in heat molding.

A biaxially oriented polyphenylene sulfide film was obtained in the same manner as in Example 1 except that a compatible plasticizer was not added. The obtained biaxially oriented polyphenylene sulfide film turned out to be a film with insufficient levels of tensile elongation and moldability, which were indicated by the results of measurement and evaluation of its characteristics as shown in Table 1.

Comparative Example 3

PPS/PEI (60/40% by weight) blended chips were produced in the same manner as in Reference Example 3 except that 60 parts by weight of the acid-terminated PPS resin prepared in Reference Example 1 and, as the thermoplastic resin A, 40 parts by weight of polyetherimide (ULTEM 1010, produced by GE Plastics) (PEI) (glass transition temperature, 215° C.) were blended and that 0.5 part by weight of γ-isocyanatepropyltriethoxysilane ("KBE9007", produced by Shin-Etsu Chemical) was blended to a total of 100 parts by weight of the PPS resin and the polyetherimide as a compatible plasticizer.

A biaxially oriented PPS film was produced in the same manner as in Example 1 except that 0.3 part by weight of calcium carbonate particle having an average particle diameter of 1.2 μm was blended to 100 parts by weight of the obtained PPS/PEI (60/40% by weight) blended chips.

The results of measurement and evaluation of the constitution and characteristics of the obtained biaxially oriented PPS film are as shown in Table 1, demonstrating a high breaking stress and a low elongation at break thereof at 200° C., which frequently caused film breakage in heat molding. Furthermore, its high melt crystallization temperature caused progression of crystallization in the film edge parts during the cooling process after melt extrusion, which led to film breakage during the process of the stretching in the transverse direction during film-formation.

Comparative Example 4

Film-forming of a biaxially oriented PPS film having a thickness of 120 μm was attempted in the same manner as in Example 14 except that 83 parts by weight of an acid-terminated PPS resin was used instead of 83 parts by weight of the Ca-terminated PPS resin, but progression of crystallization on the casting drum caused frequent film breakage during the drawing process, which led to failure of film forming.

Comparative Example 5

A biaxially oriented PPS film was produced in the same manner as in Comparative Example 1 except that a longitudinal drawing temperature of 100° C., longitudinal draw ratio of 3.8, transverse drawing temperature of 100° C. and transverse draw ratio of 3.6 were applied in Comparative Example 1. The results of measurement and evaluation of the constitution and characteristics of the obtained biaxially oriented PPS film are as shown in Table 1, demonstrating a high breaking stress and a low elongation at break at 200° C., which frequently caused film breakage in heat molding.

Comparative Example 6

A biaxially oriented PPS film was produced in the same manner as in Example 2 except that a longitudinal drawing temperature of 100° C., longitudinal draw ratio of 3.8, transverse drawing temperature of 100° C. and transverse draw ratio of 3.6 were applied in Example 2. The results of measurement and evaluation of the constitution and characteristics of the obtained biaxially oriented PPS film are as shown in Table 1, demonstrating a high breaking stress and a low elongation at break at 200° C., which frequently caused film breakage in heat molding.

TABLE 1

| | PPS1 content (parts by weight) | PPS2 content (parts by weight) | PPS2 content in PPS resin (% by weight) | Thermoplastic resin A | Content of thermoplastic resin A (parts by weight) | Average dispersion diameter (dispersed phase) (nm) | Content of compatible plasticizer (parts by weight) | Thickness (μm) | Melt crystallization temperature (° C.) | Small endothermic peak immediately below melting point (° C.) | Breaking stress at 200° C. MD/TD (MPa) | Elongation at break at 200° C. MD/TD (%) | Heat moldability |
|---|---|---|---|---|---|---|---|---|---|---|---|---|---|
| Example 1 | 23 | 67 | 74 | PEI | 10 | 200 | 0.5 | 25 | 185 | 280 | 50/50 | 160/160 | ◎ |
| Example 2 | 12 | 83 | 87 | PEI | 5 | 150 | 0.3 | 25 | 185 | 280 | 60/60 | 200/200 | ◎ |
| Example 3 | 35 | 50 | 59 | PEI | 15 | 300 | 0.7 | 25 | 195 | 280 | 90/90 | 120/120 | Δ |
| Example 4 | 23 | 67 | 74 | PEI | 10 | 200 | 0.3 | 25 | 185 | 280 | 65/65 | 150/150 | ○ |
| Example 5 | 23 | 67 | 74 | PEI | 10 | 200 | 0.3 | 25 | 185 | 280 | 80/80 | 120/120 | Δ |
| Example 6 | 12 | 83 | 87 | PEI | 5 | 150 | 0.3 | 25 | 185 | 280 | 75/75 | 180/180 | ○ |
| Example 7 | 12 | 83 | 87 | PEI | 5 | 150 | 0.3 | 25 | 185 | 280 | 85/85 | 140/140 | Δ |
| Example 8 | 23 | 67 | 74 | PEI | 10 | 300 | 0.5 | 25 | 185 | 280 | 75/75 | 120/120 | Δ |
| Example 9 | 12 | 83 | 87 | PEI | 5 | 140 | 0.7 | 25 | 185 | 280 | 80/80 | 160/160 | ○ |
| Example 10 | 12 | 83 | 87 | PEI | 5 | 300 | 0.15 | 25 | 185 | 280 | 90/90 | 140/140 | Δ |
| Example 11 | 12 | 83 | 87 | PEI | 5 | 500 | 0.3 | 25 | 185 | 280 | 80/80 | 120/120 | Δ |
| Example 12 | 12 | 83 | 87 | PES | 5 | 350 | 0.3 | 25 | 190 | 280 | 90/90 | 120/120 | Δ |
| Example 13 | 12 | 83 | 87 | PSF | 5 | 400 | 0.3 | 25 | 190 | 280 | 90/90 | 120/120 | Δ |
| Example 14 | 12 | 83 | 87 | PEI | 5 | 150 | 0.3 | 120 | 185 | 280 | 65/70 | 180/160 | ◎ |
| Example 15 | 38 | 57 | 60 | PEI | 5 | 150 | 0.3 | 25 | 195 | 280 | 80/80 | 120/120 | ○ |
| Example 16 | 62 | 33 | 35 | PEI | 5 | 150 | 0.3 | 25 | 205 | 280 | 95/95 | 100/100 | Δ |
| Example 17 | 12 | 83 | 87 | PEI | 5 | 150 | 0.3 | 25 | 185 | 280 | 90/100 | 120/100 | Δ |
| Example 18 | 12 | 83 | 87 | PEI | 5 | 150 | 0.3 | 25 | 185 | 280 | 65/120 | 180/90 | Δ |
| Comparative Example 1 | 0 | 100 | 100 | — | — | — | — | 25 | 175 | 280 | 100/100 | 90/95 | X |
| Comparative Example 2 | 4.5 | 95 | 95 | PEI | 0.5 | 130 | 0.1 | 25 | 178 | 280 | 100/100 | 90/90 | X |
| Comparative Example 3 | 60 | 0 | 0 | PEI | 40 | 600 | 0.5 | 25 | 230 | 280 | 110/110 | 70/70 | X |
| Comparative Example 4 | 95 | 0 | 0 | PEI | 5 | 200 | 0.3 | 120 | 230 | — | — | — | — |
| Comparative Example 5 | 0 | 100 | 100 | — | — | — | — | 25 | 175 | 280 | 120/110 | 60/80 | X |
| Comparative Example 6 | 12 | 83 | 87 | PEI | 5 | 150 | 0.3 | 25 | 185 | 280 | 130/120 | 55/70 | X |

Note:
MD (machine direction of film),
TD (transverse direction of film)

TABLE 2

| | PPS1 content (parts by weight) | PPS2 content (parts by weight) | PPS2 content in PPS resin (% by weight) | Thermoplastic resin A | Content of thermoplastic resin A (parts by weight) | Average dispersion diameter (dispersed phase) (nm) | Content of compatible plasticizer (parts by weight) |
|---|---|---|---|---|---|---|---|
| Example 19 | 12 | 83 | 87 | PEI | 5 | 150 | 0.3 |
| Example 20 | 12 | 83 | 87 | PEI | 5 | 150 | 0.3 |
| Example 21 | 12 | 83 | 87 | PEI | 5 | 150 | 0.3 |
| Example 22 | 12 | 83 | 87 | PEI | 5 | 150 | 0.3 |

TABLE 2-continued

|  | Thickness (μm) | Melt crystallization temperature (° C.) | Small endothermic peak immediately below melting point (° C.) | Breaking stress at 200° C. MD/TD (MPa) | Elongation at break at 200° C. MD/TD (%) | Heat moldability | Flatness |
|---|---|---|---|---|---|---|---|
| Example 19 | 25 | 185 | 280 | 60/60 | 200/200 | ⊚ | Δ |
| Example 20 | 25 | 185 | 280 | 60/60 | 200/200 | ⊚ | ○ |
| Example 21 | 25 | 185 | 265 | 55/55 | 210/210 | ⊚ | ○ |
| Example 22 | 25 | 185 | 265 | 55/55 | 210/210 | ⊚ | ○ |

Note:
MD (machine direction of film),
TD (transverse direction of film)

The invention claimed is:

1. A biaxially oriented polyarylene sulfide film made of a polyarylene sulfide resin composition consisting of acid-terminated polyarylene sulfide and Ca-terminated polyarylene sulfide having a melt crystallization temperature of not lower than 160° C. and not higher than 220° C., said biaxially oriented polyarylene sulfide film comprising a thermoplastic resin A which is at least one polymer selected from the group consisting of polyetherimides, polyethersulfones and polysulfones; said thermoplastic resin A constituting a dispersed phase having an average dispersion diameter of 50 nm to 500 nm; a content of said polyarylene sulfide being 70 to 99 parts by weight and a content of said thermoplastic resin A being 1 to 30 parts by weight taking the total content of said polyarylene sulfide and said thermoplastic resin A as 100 parts by weight; said biaxially oriented polyarylene sulfide film having a breaking stress at 200° C. in the machine direction and/or transverse direction of not less than 30 MPa and not more than 90 MPa and having an elongation at break at 200° C. in the machine direction and/or transverse direction of not less than 100% and not more than 250%.

2. The biaxially oriented polyarylene sulfide film according to claim 1, having breaking stresses at 200° C. in the machine and transverse directions of not less than 30 MPa and not more than 90 MPa and having elongations at break at 200° C. in the machine and transverse directions of not less than 120% and not more than 250%.

3. The biaxially oriented polyarylene sulfide film according to claim 1, having a melt crystallization temperature of not lower than 170° C. and not higher than 220° C.

4. The biaxially oriented polyarylene sulfide film according to claim 1, having breaking stresses at 200° C. in the machine and transverse directions of not less than 30 MPa and not more than 70 MPa and having elongations at break at 200° C. in the machine and transverse directions of not less than 130% and not more than 230%.

5. The biaxially oriented polyarylene sulfide film according to claim 1, wherein said dispersed phase made of said thermoplastic resin A comprises at its interface silicon atoms constituting siloxane bonds.

6. The biaxially oriented polyarylene sulfide film according to claim 1, wherein said polyarylene sulfide is polyphenylene sulfide.

7. The biaxially oriented polyarylene sulfide film according to claim 1, wherein said thermoplastic resin A has a glass transition temperature of not lower than 150° C. and not higher than the melting point of said polyarylene sulfide.

8. The biaxially oriented polyarylene sulfide film according to claim 1, produced by melt film-forming a resin composition prepared by kneading raw materials including said polyarylene sulfide, said thermoplastic resin A and a compatible plasticizer in an amount of 0.05 to 3 parts by weight containing at least one group selected from the group consisting of epoxy group, amino group and isocyanate group.

9. The biaxially oriented polyarylene sulfide film according to claim 1, having a film thickness of not less than 6 μm and not more than 500 μm.

10. The biaxially oriented polyarylene sulfide film according to claim 1, having a film thickness of not less than 20 μm and not more than 500 μm.

11. The biaxially oriented polyarylene sulfide film according to claim 1, having a small endothermic peak immediately below the melting point, said endothermic peak being at a temperature not lower than 220° C. and not higher than 280° C.

12. A process for producing said biaxially oriented polyarylene sulfide film according to claim 1, said process comprising melt-kneading an acid-terminated polyarylene sulfide(s), thermoplastic resin A and a compatible plasticizer(s) to prepare master chips; melt-kneading the obtained master chips eith Ca-terminated polyarylene sulfide(s) to obtain a composition; and biaxially stretching said composition.

13. A process for producing said biaxially oriented polyarylene sulfide film according to claim 1, said process comprising heat-setting carried out in not less than two steps at different temperatures, wherein the first step thereof is carried out at a temperature of 160° C. to 240° C., and wherein the maximum temperature in the second and later heat-setting steps is not lower than the heat-setting temperature in said first step and at a temperature of 220° C. to 280° C.

* * * * *